(12) United States Patent
Grandhi et al.

(10) Patent No.: US 8,649,322 B2
(45) Date of Patent: Feb. 11, 2014

(54) METHOD AND SYSTEM FOR CONTROLLING ACCESS TO A WIRELESS COMMUNICATION MEDIUM

(75) Inventors: Sudheer A. Grandhi, Mamaroneck, NY (US); Arty Chandra, Manhasset Hills, NY (US); Joseph S. Levy, Merrick, NY (US); Kamel M. Shaheen, King of Prusia, PA (US); Stephen E. Terry, Northport, NY (US); Eldad Zeira, Hunington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 729 days.

(21) Appl. No.: 11/199,446

(22) Filed: Aug. 8, 2005

(65) Prior Publication Data

US 2006/0050742 A1  Mar. 9, 2006

Related U.S. Application Data

(60) Provisional application No. 60/601,323, filed on Aug. 12, 2004.

(51) Int. Cl.
*H04W 80/04* (2009.01)

(52) U.S. Cl.
USPC .......................................................... 370/328

(58) Field of Classification Search
USPC ................................................. 370/328–338
See application file for complete search history.

(56) References Cited

U.S. PATENT DOCUMENTS 5,912,921 A * 6/1999 Warren et al. ................. 375/220
6,327,468 B1 12/2001 Van Iersel et al.
6,332,077 B1 12/2001 Wu et al.
6,597,680 B1 7/2003 Lindskog et al.
6,693,888 B2 * 2/2004 Cafarelli et al. .............. 370/338
6,717,926 B1 * 4/2004 Deboille et al. .............. 370/330
6,757,323 B1 6/2004 Fleming et al.

(Continued)

FOREIGN PATENT DOCUMENTS

EP  0 924 896  6/1999
JP  2000165930 A2  6/2000

(Continued)

OTHER PUBLICATIONS

"IEEE Wireless LAN Edition—A compilation based on IEEE Std 802.11™-1999 (R2003) and its amendments.".

(Continued)

*Primary Examiner* — Ricky Ngo
*Assistant Examiner* — Ben H Liu
(74) *Attorney, Agent, or Firm* — Volpe and Koenig, P.C.

(57) ABSTRACT

A method and system for controlling access to a wireless communication medium are disclosed. The system includes at least one access point (AP) and at least one station (STA). The AP defines a superframe for transmission of data in a time domain having a high throughput (HT) period which includes at least one scheduled resource allocation (SRA) and at least one management SRA (MSRA). The AP broadcasts an extended beacon (EB) including information about the SRA and MSRA. The SRA is defined for transmitting traffic data between the AP and the STA, and the MSRA is defined for transmitting management and control data between the AP and the STA. The system reduces station battery consumption, supports higher throughput for non-real time (NRT) traffic and is more efficient for real time (RT) traffic while maintaining full compatibility.

43 Claims, 14 Drawing Sheets

(56) References Cited

U.S. PATENT DOCUMENTS

| | | | |
|---|---|---|---|
| 6,795,407 B2* | 9/2004 | Chesson | 370/311 |
| 6,907,258 B2* | 6/2005 | Tsutsumi et al. | 455/512 |
| 6,940,843 B2* | 9/2005 | Goodall et al. | 370/338 |
| 6,983,167 B2* | 1/2006 | Adachi et al. | 455/522 |
| 6,985,465 B2* | 1/2006 | Cervello et al. | 370/333 |
| 7,002,938 B2* | 2/2006 | Hester et al. | 370/330 |
| 7,088,702 B2 | 8/2006 | Shvodian | |
| 7,103,386 B2* | 9/2006 | Hoffmann et al. | 455/562.1 |
| 7,120,138 B2* | 10/2006 | Soomro et al. | 370/343 |
| 7,206,840 B2* | 4/2007 | Choi et al. | 709/225 |
| 7,224,679 B2* | 5/2007 | Solomon et al. | 370/338 |
| 7,257,101 B2* | 8/2007 | Petrus et al. | 370/332 |
| 7,280,518 B2* | 10/2007 | Montano et al. | 370/338 |
| 7,301,924 B1* | 11/2007 | Gurbuz et al. | 370/335 |
| 7,302,227 B2 | 11/2007 | Sakoda | |
| 7,333,462 B2* | 2/2008 | Palm et al. | 370/338 |
| 7,388,833 B2* | 6/2008 | Yuan et al. | 370/230.1 |
| 7,400,901 B2* | 7/2008 | Kostic et al. | 455/525 |
| 7,460,503 B2* | 12/2008 | Young | 370/331 |
| 7,496,081 B2* | 2/2009 | Salokannel et al. | 370/348 |
| 7,555,004 B2* | 6/2009 | Orlik et al. | 370/445 |
| 7,561,510 B2* | 7/2009 | Imamura et al. | 370/205 |
| 7,565,109 B2* | 7/2009 | Morioka et al. | 455/63.1 |
| 7,593,422 B2* | 9/2009 | Shvodian | 370/442 |
| 7,616,602 B2* | 11/2009 | Choi et al. | 370/329 |
| 7,787,437 B2* | 8/2010 | Sakoda | 370/350 |
| 8,000,221 B2* | 8/2011 | Walton et al. | 370/204 |
| 2002/0055333 A1 | 5/2002 | Davies et al. | |
| 2002/0060995 A1* | 5/2002 | Cervello et al. | 370/332 |
| 2002/0188723 A1* | 12/2002 | Choi et al. | 709/225 |
| 2003/0063619 A1* | 4/2003 | Montano et al. | 370/443 |
| 2003/0152054 A1 | 8/2003 | Hirano et al. | |
| 2003/0163579 A1 | 8/2003 | Knauerhase et al. | |
| 2003/0186724 A1* | 10/2003 | Tsutsumi et al. | 455/561 |
| 2004/0017793 A1 | 1/2004 | Thermond et al. | |
| 2004/0022219 A1 | 2/2004 | Mangold et al. | |
| 2004/0042460 A1 | 3/2004 | Gruhl et al. | |
| 2004/0053621 A1 | 3/2004 | Sugaya | |
| 2004/0081131 A1* | 4/2004 | Walton et al. | 370/344 |
| 2004/0100929 A1 | 5/2004 | Garcia-Luna-Aceves | |
| 2004/0105512 A1 | 6/2004 | Priotti | |
| 2004/0147249 A1* | 7/2004 | Wentink | 455/414.1 |
| 2004/0151109 A1 | 8/2004 | Batra et al. | |
| 2004/0151164 A1 | 8/2004 | Kubler et al. | |
| 2005/0063343 A1* | 3/2005 | Hoffmann et al. | 370/334 |
| 2005/0085279 A1* | 4/2005 | Aoki | 455/574 |
| 2005/0135284 A1* | 6/2005 | Nanda et al. | 370/294 |
| 2005/0174964 A1* | 8/2005 | Orlik et al. | 370/329 |
| 2005/0226203 A1* | 10/2005 | Ho | 370/349 |
| 2005/0243843 A1* | 11/2005 | Imamura et al. | 370/401 |
| 2006/0002357 A1* | 1/2006 | Sherman | 370/338 |
| 2006/0018287 A1* | 1/2006 | Walton et al. | 370/334 |
| 2006/0030362 A1 | 2/2006 | Fukuda | |
| 2006/0050742 A1* | 3/2006 | Grandhi et al. | 370/506 |
| 2006/0126581 A1* | 6/2006 | Katsumata et al. | 370/338 |

FOREIGN PATENT DOCUMENTS

| | | |
|---|---|---|
| WO | 98/27747 | 6/1998 |
| WO | 01/20851 | 3/2001 |
| WO | 03/039035 | 5/2003 |
| WO | 04/064439 | 7/2004 |
| WO | 2004/064439 | 7/2004 |
| WO | 05/055527 | 6/2005 |
| WO | 2005/055527 | 6/2005 |

OTHER PUBLICATIONS

"Draft Amendment to Standard [for] Information Technology—Telecommunications and Information Exchange Between Systems—LAN/MAN Specific Requirements—Part 11: Wireless Medium Access Control (MAC) and Physical Layer (PHY) specifications: Medium Access Control (MAC) Quality of Service (QoS) Enhancements. " IEEE P802.11e/D8.0, Feb. 2004.

"802.11h™IEEE Standard for Information technology—Telecommunications and information exchange between systems—Local and Metropolitan are networks—Specific requirements—Part 11: Wireless LAN Medium Access Control (MAC) and Physical Layer (PHY) specifications—Amendment 5: Spectrum and Transmit Power Mangement Extentions in the 5 GHz band in Europe. " Oct. 14, 2003. IEEE Std 802.11h™-2003.

"Draft Supplement to Standard for Information Technology—Telecommunications and Information Exchange Between Systems—LAN/MAN Specific Requirements—Part 11: Wireless Medium Access Control (MAC) and physical layer (PHY) specifications: Spectrum and Transit Power Management extentions in the 5GHz band in Europe. " P802.11h/D3, 11, May 2003.

"IEEE Standard for Information technology—Telecommunications and information exchange between systems—Local and metropolitan are networks—Specific requirements—Part 11: Wireless Medium Access Control (MAC) and Physical Layer (PHY) specifications: Amendment 7: Medium Access Control (MAC) Quality of Service (QoS) Enhancements. " IE P802.11e/D11.0, Oct. 2004.

"Draft Amendement to Standard for Information Technology—Telecommunications and Information Exchange Between Systems—LAN/MAN Specific Requirements—Part 11: Wireless Medium Access Control (MAC) and physical layer (PHY) specifications: Amendment 7: Radio Resource Measuement. " IEEE 802.00k/D1.0, Jul. 2004.

"Draft Amendement to Standard for Information Technology—Telecommunications and Information Exchange Between Systems—LAN/MAN Specific Requirements—Part 11: Wireless Medium Access Control (MAC) and physical layer (PHY) specifications: Amendment 9: Radio Resource Measuement. " IEEE P802.11k/D2.2, Jul. 2005.

"IEEE Wireless LAN Edition—A compilation based on IEEE Std 802.11™-1999 (R2003) and its amendments. " Sep. 19,2003.

"Draft Amendment to Standard [for] Information Technology—Telecommunications and Information Exchange Between Sstems—LAN/MAN Specific Requirements—Part 11: Wireless Medium Access Control (MAC) and Phsical Layer (PHY) specifications: Medium Access Control (MAC) Quality of Service (QoS) Enhancements. " IEEE P802.11e/D8.0, Feb. 2004.

"Draft Supplement to Standard for Information Technology—Telecommunications and Information Exchange Between Sstems—LAN/MAN Specific Requirements—Part 11: Wireless Medium Access Control (MAC) and Phsical Layer (PHY) specifications: Spectrum and Transmit Power Management extentions in the 5GHz band in Europe. " P802.11h/D3.11, May 2003.

"Draft Amendment to Standard [for] Information Technology—Telecommunications and Information Exchange Betwen Sstems—LAN/MAN Specific Requirements—Part 11: Wireless Medium Access Control (MAC) and Physical Laer (PHY) specifications: Medium Access Control (MAC) Quality of Service (QoS) Enhancements." IEE P802.11e/D8.0, Feb. 2004.

"Draft Amendment to Standard for Information Technology—Telecommunications and Information Exchange Between Systems—LAN/MAN Specific Requirements—Part 11: Wireless Medium Access Control (MAC) and Physical Layer (PHY) specifications: Amendment 7: Radio Resource Measurement." IEEE 802.11k/D1.0, Jul. 2004.

"Draft Amendment to Standard for Information Technology—Telecommunications and Information Exchange Between Systems—LAN/MAN Specific Requirements—Part 11: Wireless Medium Access Control (MAC) and physical Layer (PHY) specifications: Amendment 9: Radio Resource Measurement. " IEEE P802.11k/D2.2, Jul. 2005.

"Draft Supplement to Standard for Information Technology—Telecommunications and Information Exchange Between Systems—LAN/MAN Specific Requirements—Part 11: Wireless Medium Access Control (MAC) and Physical Layer (PHY) specifications: Spectrum and Transmit Power Management extentions in the 5GHz band in Europe. " P802.11h/D3.11, May 2003

"IEEE Standard for Information technology—Telecommunications and information exchange between systems—Local and Metroplitan are networks—Specific requirements—Part 11: Wireless LAN Medium Access Conrol (MAC) and Physical Layer (PHY) specifi-

(56) References Cited

OTHER PUBLICATIONS cations—Amendment 7: Medium Access Control (MAC) Quality of Service (QoS) Enhancements." IEEE P802.11e/D11.0, Oct. 2004.

"IEEE Wireless LAN Edition—A compilation based on IEEE Std 802.11™-1999 (R2003) and its amendments.". Sep. 19, 2003.

Berjerano et al, "MiFi: A Framework for Fairness and QoS Assurance in Current IEEE 802.11 Networks with Multiple Access Points," 23rd Annual Joint Conference of the IEEE Computer and Communications Societies, vol. 2. pp. 1229-1240 (Mar. 2004).

Mangold et al., "IEEE 802.11e Wireless LAN for Quality of Service," Proceedings of the European Wireless, vol. 1, pp. 32-39 (Feb. 2002).

Yang, "P-HCCA: A New Scheme for Real-time Traffic with QoS in IEEE 802.11e Based Networks".

"IEEE Wireless LAN Edition—A compilation based on IEEE Std 802.11™-1999 (R2003) and its amendments." Sep. 19, 2003.

"Draft Amendment to Standard [for] Information Technology—Telecommunications and Information Exchange Between Systems—LAN/MAN Specific Requirements—Part 11: Wireless Medium Access Control (MAC) and Physical Layer (PHY) specifications: Medium Access Control (MAC) Quality of Service (QoS) Enhancements." IEEE P802.11e/D8.0, Feb. 2004.

"802.11h™IEEE Standard for Information technology—Telecommunications and information exchange between systems—Local and Metroplitan are networks—Specific requirements—Part 11: Wireless LAN Medium Access Conrol (MAC) and Physical Layer (PHY) specifications—Amendment 5: Spectrum and Transmit Power Management Extentions in the 5 GHz band in Europe. " Oct. 14, 2003. IEEE Std 802.11h™-2003.

"Draft Supplement to Standard for Information Technology—Telecommunications and Information Exchange Between Systems—LAN/MAN Specific Requirements—Part 11: Wireless Medium Access Control (MAC) and physical layer (PHY) specifications: Spectrum and Transmit Power Management extensions in the 5GHz band in Europe." P802.11h/D3.11, May 2003.

"IEEE Standard for Information technology—Telecommunications and information exchange between systems—Local and metropolitan area networks—Specific requirements—Part 11: Wireless Medium Access Control (MAC) and Physical Layer (PHY) specifications: Amendment 7: Medium Access Control (MAC) Quality of Service (QoS) Enhancements." IEEE P802.11e/D11.0, Oct. 2004.

"Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment 7: Radio Resource Measurement." IEEE 802.11k/D1.0, Jul. 2004.

"Draft Amendment to Standard for Information Technology—Telecommunications and Information Exchange Between Systems—LAN/MAN Specific Requirements—Part 11: Wireless Medium Access Control (MAC) and physical layer (PHY) specifications: Amendment 9: Radio Resource Measurement." IEEE P802.11k/D2.2, Jul. 2005.

\* cited by examiner

METHOD AND SYSTEM FOR CONTROLLING ACCESS TO A WIRELESS COMMUNICATION MEDIUM

CROSS REFERENCE TO RELATED APPLICATION

This application claims the benefit of U.S. provisional application No. 60/601,323 filed Aug. 12, 2004, which is incorporated by reference as if fully set forth.

FIELD OF INVENTION

The present invention is related to a wireless communication system. More particularly, the present invention is related to a method and system for controlling access to a medium in a wireless communication system.

BACKGROUND

The IEEE 802.11 working group, Task Group n (TGn), has been set up to develop a new wireless standard with a data rate in excess of 200 Mbps to deliver high throughput data, such as high definition television (HDTV) and streaming video. The theoretical maximum throughput of existing standards IEEE 802.11a and IEEE 802.11g is around 54 Mbps, and the highest usable throughput is around 25 Mbps.

It would be desirable to provide a more efficient medium access control (MAC) architecture and associated procedures which support a variety of physical layer interfaces that may be optimized to meet a throughput of 100 Mbps on top of the service access point of the MAC layer under the current IEEE 802.11 wireless local area network (WLAN) service requirements and deployment scenario assumptions.

SUMMARY

The present invention is related to a method and system for controlling access to a wireless communication medium. A MAC architecture builds upon the existing IEEE 802.11 MAC architecture and its IEEE 802.11e extensions to provide higher performance. The system includes at least one access point (AP) and at least one station (STA). The AP defines a superframe for transmission of data in a time domain having a high throughput (HT) period which includes at least one scheduled resource allocation (SRA) and at least one management SRA (MSRA). The AP broadcasts an extended beacon (EB) including information about the SRA and MSRA. The SRA is defined for transmitting traffic data between the AP and the STA, and the MSRA is defined for transmitting management and control data between the AP and the STA. The present invention reduces STA battery consumption, supports higher throughput for non-real time (NRT) traffic and is more efficient for real time (RT) traffic than required by IEEE 802.11e while maintaining full compatibility.

The present invention eliminates a hidden node problem. The present invention provides higher performance for NRT services, better stability and a higher number of users or a higher throughput than required by IEEE 802.11e on enhanced distributed channel access (EDCA) for NRT services, such as a file transfer protocol (FTP) or web browsing under similar latency requirements, and corrects the IEEE 802.11e unfairness towards AP transmissions.

The present invention provides higher performance for RT services while guaranteeing quality of service (QoS), reduced STA power consumption, higher MAC efficiency and throughput for all RT applications, lower delay jitter compared to IEEE 802.11e EDCA, higher MAC efficiency for voice over Internet protocol (VoIP) applications with similar delay jitter compared to IEEE 802.11e hybrid coordination function (HCF) controlled channel access (HCCA).

The present invention provides backward compatibility with IEEE 802.11 MAC and its IEEE 802.11e extensions, as well as with IEEE 802.11k.

The present invention supports efficient physical (PHY) operation through orderly back-and-forth transmissions that enable the timely reception of channel quality information (CQI) used to determine coding and modulation rates, the use of channel reciprocity or, if necessary, reception of channel state information (CSI) which may be used to optimize transmitter operation, support of hybrid automatic repeat request (ARQ), and enhanced frequency hopping (optional).

The present invention incorporates a flexible design which supports different types of PHY interfaces including, but not limited to, multiple input multiple output (MIMO) and forward error correction (FEC) coding techniques, orthogonal frequency division multiple access (OFDMA) operation, and both a 20 MHz and 40 MHz HT STA in the same superframe, which is extendable to other bandwidths if necessary.

The present invention provides enhanced peer-to-peer direct transfer of data under the control of an AP and support of relay operation to extend service area coverage and rates.

BRIEF DESCRIPTION OF THE DRAWINGS

A more detailed understanding of the invention may be had from the following description of a preferred example, given by way of example and to be understood in conjunction with the accompanying drawing wherein:

FIG. 26 is a block diagram of an RAR Specification IE in accordance with the present invention;

FIG. 27 is a block diagram of a Resource Allocation Notification IE in accordance with the present invention;

FIG. 28 is a block diagram of a superframe structure for simulation;

DETAILED DESCRIPTION OF THE PREFERRED EMBODIMENTS

Figure 1:
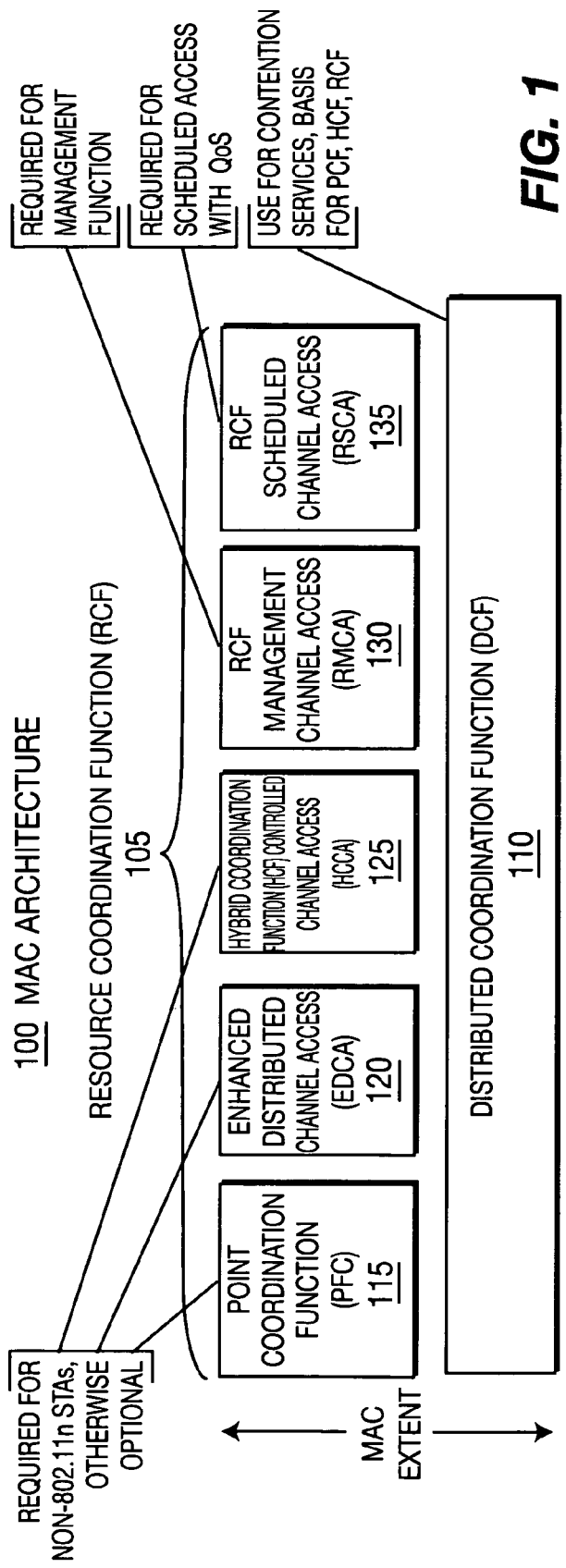
FIG. 1 is a block diagram of MAC architecture in accordance with the present invention.

Hereafter, the terminology "STA" includes but is not limited to a user equipment, a wireless transmit/receive unit (WTRU), a fixed or mobile subscriber unit, a pager, or any other type of device capable of operating in a wireless environment. When referred to hereafter, the terminology "AP" includes but is not limited to a base station, a Node-B, a site controller or any other type of interfacing device in a wireless environment. Hereafter, the terminology "STA" refers to a STA configured to support IEEE 802.11n and the terminology "legacy STA" refers to a STA configured to support IEEE 802.11 or IEEE 802.11e.

Hereinafter following terminology will be used in the present invention. AP means any AP that is compliant with the proposed IEEE 802.11n standard. STA, (or interchangeably IEEE 802.11n STA, high throughput (HT) STA), means any STA that is compliant with the proposed IEEE 802.11n standard. Legacy AP means any AP that is complaint with IEEE 802.11 standards predating the IEEE 802.11n standard and therefore does not support the proposed IEEE 802.11n standard. Legacy STA includes any STA that is complaint with IEEE 802.11 standards predating the proposed IEEE 802.11n standard and therefore does not support the proposed IEEE 802.11n standard.

Hereafter, the present invention will be described in context with an IEEE 802.11n environment. However, it should be noted that the present invention is applicable to any other wireless communication environments.

The MAC in accordance with the present invention builds upon the existing IEEE 802.11 MAC architecture and its IEEE 802.11e extensions to provide higher performance for networks which include IEEE 802.11n compliant AP and STAs. The system in accordance with the present invention reduces station battery consumption, supports higher throughput for NRT traffic and is more efficient for RT traffic than IEEE 802.11e while maintaining full compatibility, supporting both legacy and high throughput STA at the same time. The present invention provides MAC architecture and procedures supporting a variety of physical layer interfaces that may be optimized under the current IEEE 802.11 WLAN service requirements and deployment scenario assumptions.

In order to achieve uninterrupted operation for STA while maintaining full backward compatibility, a superframe is partitioned between HT period(s) used for IEEE 802.11n access and an optional legacy period used for IEEE 802.11 and IEEE 802.11e access. Both RT and NRT services are provided to STA during the IEEE 802.11n period of the super frame using different methods. NRT operation is typified by unpredictable and widely varying data rates with no formal latency requirements.

Downlink (AP→STA) data transfers are done at the discretion of the controller, which will generally (but not necessarily) be implemented in the AP. No contention can happen during this time, either from legacy or HT STA. Acknowledgement and feedback packets are regularly transmitted in the reverse direction (uplink, or STA→AP) after single or multiple packets, depending on conditions and as has been negotiated between the nodes and can be exploited to optimize physical layer performance. The mechanism is flexible enough to allow the use of sophisticated scheduling algorithms which may take into account buffer occupancy as well as channel conditions to further enhance system performance. This operation takes place during Scheduled Resource Allocation (SRA) periods in the superframe.

Uplink (STA→AP) data transfers are accomplished via a slotted Aloha bandwidth request, shortly after followed by a response indicating permission to transmit data. As for the downlink case, acknowledgement and feedback packets are regularly transmitted in the reverse direction after single or multiple packets, depending on conditions and as has been negotiated between the nodes. The requests are sent during a management SRA (MSRA) while data transfers are performed during an SRA. The usage of short packets in a slotted Aloha mode increases throughput and stability at high loads and eliminates the hidden node problem as STAs are not required to sense the medium for contention. As in the case of the downlink, the mechanism is flexible enough to allow the use of sophisticated scheduling algorithms which may take into account buffer occupancy as well as channel conditions to further enhance system performance. Small packets used for management and control purposes, (e.g. in order to set up RT operation), may also be exchanged at this time.

RT operation is typified by predictable data rates. The resources are indicated to each user by an extended beacon (EB) transmitted once or several times per superframe. As a result, the polling overhead is reduced, but more importantly STAs are required to listen only a small fraction of the time which reduces the STA power consumption requirements. As in the case of NRT services, acknowledgement and feedback packets are regularly transmitted in the reverse direction after single or multiple packets, and can be exploited to optimize physical layer performance. As for NRT scheduling can consider both traffic and channel conditions.

The EB has the several applications in the IEEE 802.11k standard. First, the EB allows power saving when an STA scans frequency bands to search for neighbors. Second, the EB allows for reduction of interruption time during neighbor scanning for BSS transition. Third, the EB extends the range of the STA.

The EB can be transmitted at a low rate or high rate. At the low rate, the EB has applications in extending range. At high rates, the EB has applications in decreasing beacon overhead. The EB is applicable to several scenarios including IEEE 802.11n and non-IEEE 802.11n, Oct. 20, 1940 MHz and dual 20 MHz operation (IEEE 802.11n).

The EB can replace the standard beacon and will then contain some or all the information elements of the standard beacon. Also, the EBs are of variable length.

FIG. 1 is a block diagram of a MAC architecture 100 which expands the architecture adopted for IEEE 802.11e in accordance with the present invention. The MAC architecture 100 includes a resource coordination function (RCF) 105 and a distributed coordination function (DCF) 110. The RCF 105 may include a point coordination function (PCF) 115, an enhanced distributed channel access (EDCA) 120, a hybrid coordination function (HCF) controlled channel access (HCCA) 125, an RCF management channel access (RMCA) 130 and an RCF scheduled channel access (RSCA) 135. The RMCA 130 and the RSCA 135 are new functions added for IEEE 802.11n. The RCF 105 and the DFC 110 are present with HCF and PCF for backward compatibility.

The RCF 105 is usable only in IEEE 802.11n configurations and provides full quality of service (QoS). All IEEE 802.11n STAs implement the RCF 105. The RCF 105 uses functions from the DCF 110 and new scheduling functions to allow a set of frame exchange sequences for data transfers with or without QoS. There are two access procedures supported by the RCF 105 for management and scheduling functions. First, RMCA 130 is provided by the RCF 105 for small packet transfers and schedule requests/reservations. Second, RSCA 135 is provided for contention free data transfer providing full QoS support. Typically, the RMCA 130 is used for all bandwidth requests for services which will be supported by the RSCA 135.

Figure 2:
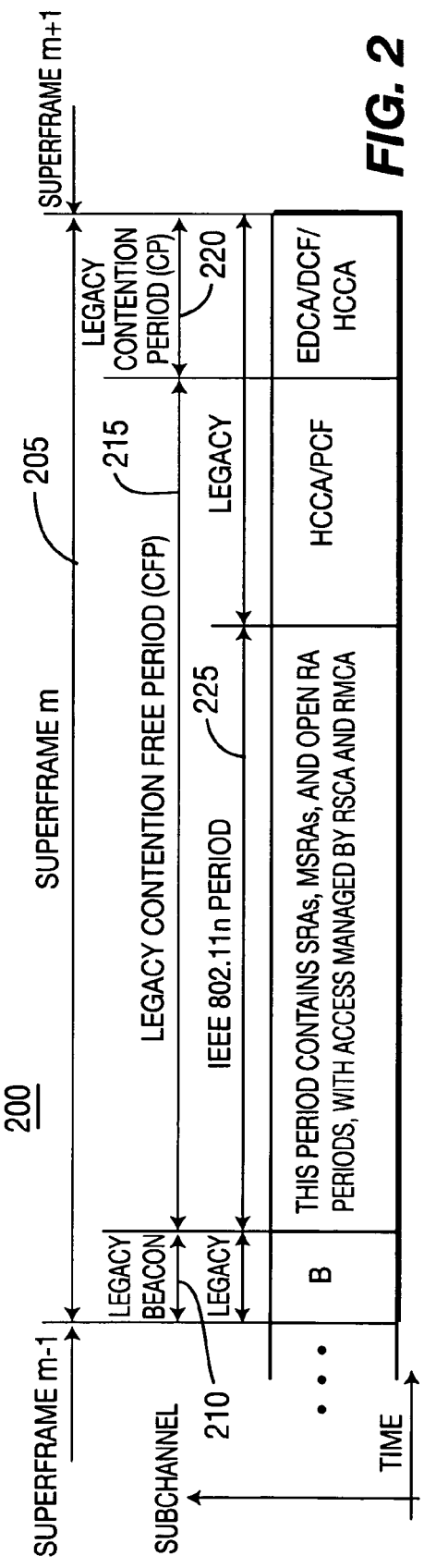
FIG. 2 is a block diagram of a superframe structure with legacy operation in accordance with the present invention.

The superframe structure used when the RCF 130 is in operation is described hereinafter. FIG. 2 is a block diagram of a superframe structure 200 with legacy operation in accordance with the present invention. A superframe 205 comprises a legacy beacon 210, a legacy contention free period (CFP) 215 and a legacy contention period (CP) 220. An IEEE 802.11n period 225 is defined in the CFP 215. The IEEE 802.11n period 225 contains contention as well as scheduled transmissions for IEEE 802.11n STAs. The CFP 215 ensures that legacy STAs will not access the channel unless polled by the AP. When an RCF 105 is operating in a basic service set (BSS), a CFP 215 and a CP 220 are generated based on the need to support legacy STAs and IEEE 802.11n STAs.

The IEEE 802.11n STAs are supported in a period defined as IEEE 802.11n period 225. The CP is used to support operation of legacy STAs. IEEE 802.11n STAs are permitted to contend here though it may not be the preferred mode of operation. The IEEE 802.11n period 225 supports EBs, scheduled resource allocations (SRAs) and management SRAs (MSRAs) with variable guard times separating them.

When legacy operation is not enabled, the superframe structure 200 does not contain the beacon 210 and CP 220.

Figure 3:
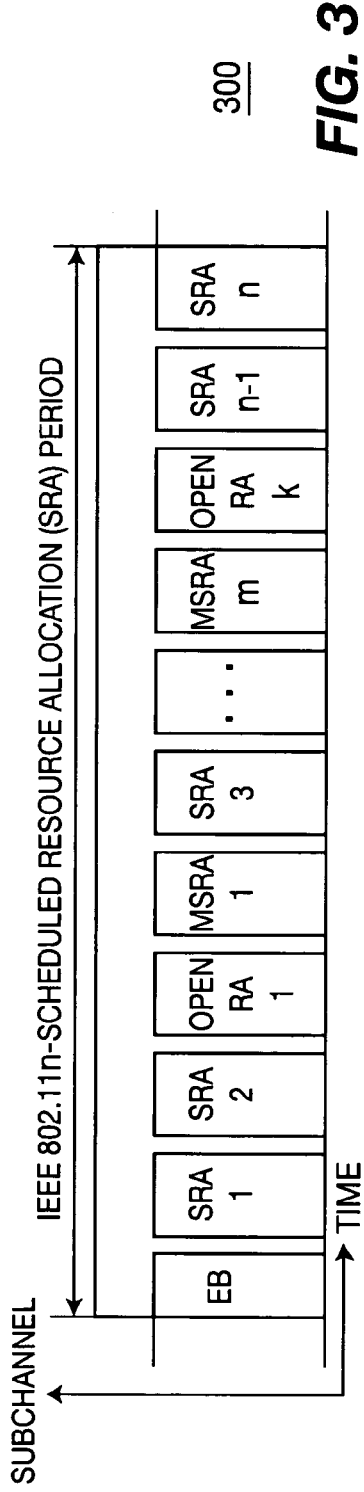
FIG. 3 is a block diagram of a superframe structure without legacy operation in accordance with the present invention.
Figure 4:
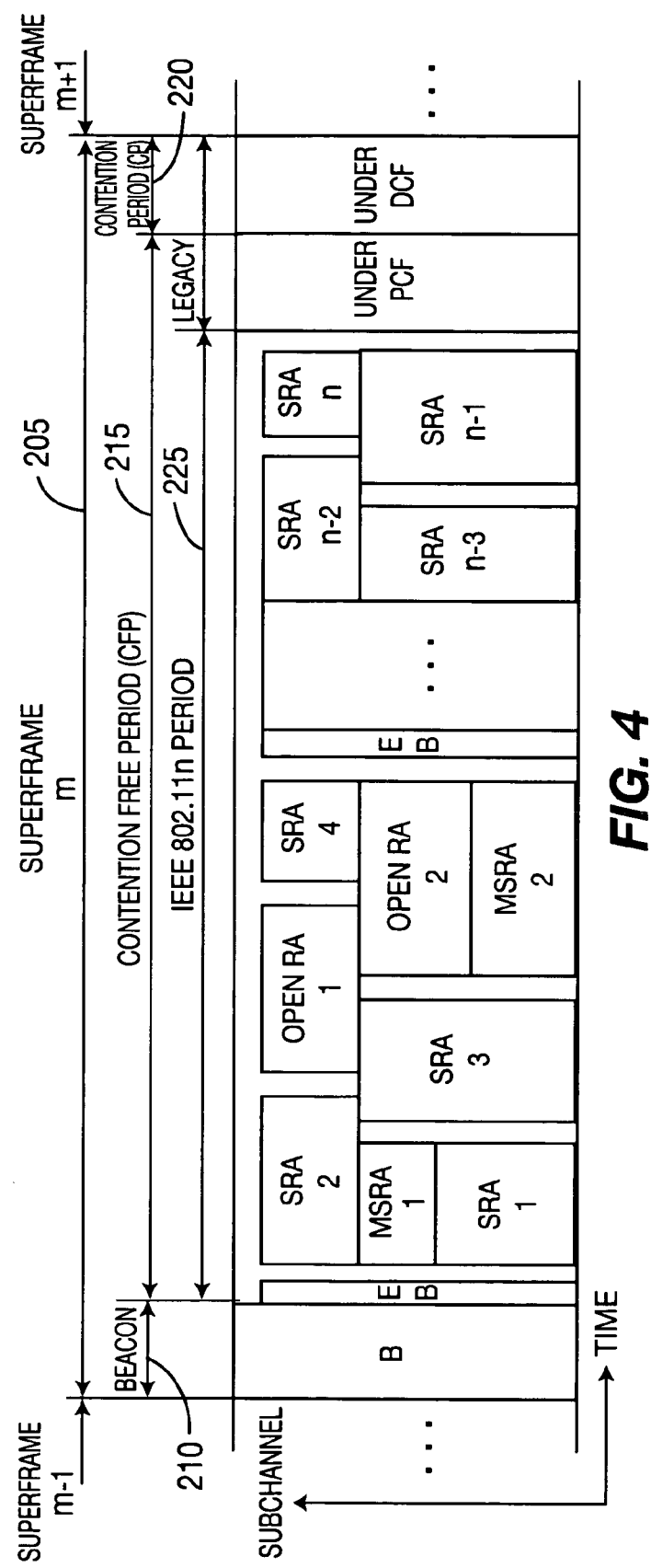
FIG. 4 is a block diagram illustrating a flexible superframe structure in accordance with the present invention.

A simple superframe structure 300 where the SRAs are allocated based only on time is shown in FIG. 3 when legacy operation is disabled. The superframe structure 300 is independent of the physical (PHY) layer and supports all types of PHY layers. In the case where the PHY layer allows allocation of variable subchannels (such as in OFDMA) the superframe would be as shown in FIG. 4.

The AP gains control of the wireless medium for the CFP 215 by including a contention free (CF) parameter set element in the Beacon frames. Thus, all STAs set their network allocation vectors (NAVs) to the "CFPDurRemaining" value in the CF parameter set element, which indicates how much longer the CFP will last. This prevents contention in the CFP 215 by the legacy STAs. The CFP 215 generated by the AP always ends with a CF-End frame. The IEEE 802.11n period may be established anywhere in the CFP 215 by the AP.

The legacy beacon 210 is transmitted in the 20 MHz channel so that all STAs including IEEE 802.11n STAs can receive it. It contains all of the legacy information and is modified to include the information about the EB in the IEEE 802.11n period. The periodicity, frequency band, and subchannel information about the EB is explicitly included in the beacon. The EB includes information on the locations, durations and types of the SRAs, MSRAs and open RA (ORA) periods, in addition to the system information defined in the current IEEE 802.11 beacon.

The EB may be transmitted at a higher data rate than the beacon. When legacy operation is enabled the first occurrence of the EB is immediately following the beacon. The subsequent occurrences of the EB are based on the periodicity of the EB.

In the absence of legacy operation, legacy beacon need not be present, and the EB operates as an only beacon in the system. In the presence of legacy operation, a superframe is defined as a period between two legacy beacons. Otherwise, it is a period between two EBs. There can be one or more EBs in a superframe in presence of a legacy beacon. IEEE 802.11n STAs may listen to the beacon to locate the EB(s) or they may directly listen to the EB(s). The length of EB is variable.

The STAs can access the wireless medium in an efficient way when compared to legacy STAs to transmit MAC protocol data units (PDUs), (i.e., MPDUs). The basic unit of allocation to an STA under the RCF 105 is an SRA. Each SRA is defined by a starting time and duration. An SRA is assigned to an STA by the RCF 105 in the IEEE 802.11n period under RSCA 135. The assignment of the SRA may be set up by an STA making a request under the RMCA 130. The transmissions do not extend beyond the assigned SRA. During the specified duration of an SRA assigned to an STA, no other STA can compete for the wireless medium.

MSRAs are management SRAs set up by the RCF 105 in the IEEE 802.11n period 225 under the RMCA 135. MSRAs are used for management functions such as resource request and response, association request and response, and exchange of management information. Each MSRA has a starting time and duration. Transmissions shall not extend beyond the duration of an MSRA. The RCF shall ensure that sufficient MSRAs are allocated in each IEEE 802.11n period. STAs compete for the wireless medium during MSRAs.

ORAs are the resources that are available after all the SRAs and MSRAs have been allocated in the superframe. It can also arise because an SRA has not been fully utilized. It is different from SRAs as SRAs are allocated to a given traffic stream of an STA. These resources are controlled by the AP. It can be used by the AP for downlink and uplink transmission of NRT services and control traffic; to provide supplemental SRAs; and for broadcast and multicast traffic. Some ORAs can be assigned to a group of STAs.

The RMCA mechanism provides access to the wireless medium for management functions within IEEE 802.11n period by setting up MSRAs for data packet exchanges and request/reservation for scheduled transmissions.

The channel access procedure under RMCA depends on the type of MSRA that is operational. The AP announces the RMCA parameters in the EB. These parameters include information about the MSRAs such as location, duration, and access mechanism and optionally type. The type could differentiate between MSRAs used for associated and un-associated STAs. Preferably, a slotted Aloha contention based access mechanism is used in all MSRA. However, a CSMA/CA mechanism as defined by IEEE 802.11e or any other contention mechanisms may be implemented. The contention mechanism is signaled in the EB.

MSRAs allow associated and unassociated STAs and AP to exchange messages in a contention mode. The data exchange is typically small data packets, such as resource allocation requests for scheduled transmissions, association/Reassociation requests. The data transmitted by associated STAs are typically Resource Allocation Request frames in order to request assignment of SRAs in the IEEE 802.11n period. The data transmitted by new or unassociated STAs are typically Association/Reassociation Request frames in order to request association with APs. In addition, small packets may optionally be transmitted by STAs subject to a certain limit in the size of the packet. The MSRA is identified for at least one of data packet and control packet transmission.

Figure 5:
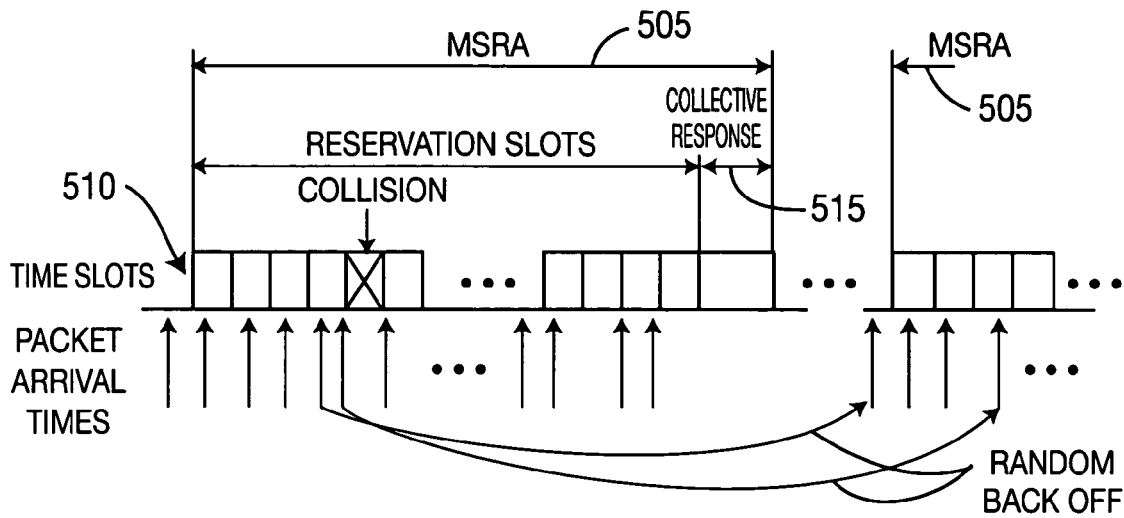
FIG. 5 is a diagram illustrating slotted Aloha operation in MSRA.

FIG. 5 shows a slotted Aloha mechanism 500 for an MSRA 505. In the slotted Aloha mechanism 500, STAs access the wireless medium with short data packets. The wireless medium is divided into time slots 510 of size equal to the data packet duration, and transmissions are allowed only at the beginning of the slots.

An exponential backoff mechanism is implemented as follows. A back off counter is maintained at each STA and is decremented every slot. A pending packet is transmitted when the back off counter becomes zero. The back off counter is chosen as a uniformly distributed random variable from a contention window (CW). In the first attempt, the CW is set to a minimum. The size of the CW grows with the number of retransmission attempts until it reaches an upper limit. The rate at which the CW grows may optionally depend on the priority of the traffic. For example the smaller the access delay specification of the traffic the slower the growth of the CW. Controlling the CW based on the access delay specification will allow better management of access delays in a slotted Aloha access under high load situations. At the end of the MSRA, the AP transmits a collective response Frame 515, which is a collective response for all STAs that contended in the MSRA 505. The collective response frame 515 includes resource allocation responses for associated STAs that successfully transmitted their resource allocation requests, and association/reassociation responses for unassociated STAs that successfully transmitted their association/reassociation requests. The STAs that were unsuccessful have to retransmit their packets using the back off counter. The backoff counter is decremented only during MSRA periods.

The Aloha mechanism 500 allows the RCF 105 to take into consideration multiple factors regarding the service requirements, buffer occupancy and channel conditions of each of the STAs that has requested resources.

If a CSMA/CA scheme is used for MSRAs, each successful transmission from an STA is individually acknowledged with an ACK message from the AP. This is inefficient when compared to the collective response in the case of the slotted Aloha mechanism 500 described above.

The RSCA 135 uses a resource coordinator (RC) that provides QoS service support through scheduled resource allocation. The RC operates under rules that are different from the point coordinator (PC) and the hybrid coordinator (HC).

SRAs are assigned to STAs to serve all types of traffic, (e.g. NRT and RT). The RC can serve traffic with SRAs that change little across superframes and would be recurring until the transmission is terminated by the originating STA. Such SRAs, (that are quasi-static in nature), are suitable for RT periodic traffic. However, the RC can also serve traffic with SRAs that may change frequently from superframe to superframe and spanning one or more superframes to transmit a data burst. These types of SRAs, (that are dynamic in nature), may be used to serve any type of traffic and are allocated per data burst. This mechanism allows the RC the flexibility to rearrange SRA assignments to optimize the utilization of resources. The RC shall account for all transmissions, including the response frames that will be part of the SRA transmission when setting the SRA duration in an assignment of an SRA to an STA. All resources not assigned as SRAs or MSRAs are managed by the RC as ORA. ORAs have many applications and allow the RC to efficiently utilize resources that are not scheduled.

Non-AP STAs may send resource allocation requests during MSRAs while providing QoS information in the Resource Allocation Request Specification information element (IE), directed to the RC. STAs should indicate that the transmission should take place only under RSCA and also optionally under RMCA.

The RC traffic delivery and SRA assignment are scheduled during the IEEE 802.11n period to meet the QoS requirements of a given traffic. The AP announces the parameters for the assigned SRAs in the EB. An STA may initiate multiple frame exchange sequences during an SRA of sufficient duration to perform more than one such sequence. SRA assignments may be based on the RC's BSS-wide knowledge of pending traffic belonging to users with different traffic characteristics and is subject to the BSS-specific QoS policies.

The SRA assignment and modification involves the creation, modification, and termination of SRAs for the exchange of data between two or more STAs. An STA may support one or more connections depending upon the applications it supports. An SRA assignment to an STA for a connection to serve a given type of traffic involves creation of SRA allocations over one or more superframes. The assignment may be modified as required during the lifetime of connection. Creation, modifications, and terminations of SRAs between two or more STAs are carried out by negotiations between the originating STA and the AP using the Resource Allocation Request and Resource Allocation Response messages. Once an SRA is assigned with an index, the SRA may be modified or terminated. Only an STA that is associated with an AP shall send a Resource Allocation Request message to the AP for an SRA assignment.

The access delay for an SRA can be managed by including a priority for access in MSRAs. Once access is granted there is a guaranteed access to the wireless medium/channel with the required QoS.

For the creation of an SRA, the originating STA sends a Resource Allocation Request to the AP for a new connection with target STAs in an MSRA, and sets the destination address list to the target STA addresses, Resource Index to a default value indicating unassigned status, RAR ID to a unique value for the duration of the negotiation, RAR Type to quasi-static assignment or dynamic assignment, and all other parameters to appropriate values.

The AP on receiving the Resource Allocation Request message from the originating STA shall respond with a Resource Allocation Response message to the originating STA in an MSRA with the Resource Index field set to an unused value and all other parameters to appropriate values. Service Duration per Superframe and Service Interval determine the duration of a quasi-static SRA assignment and its frequency with respect to the superframe in a recurring fashion. Service Duration per Superframe, Service Interval, and Maximum service duration determine the duration of a dynamic SRA assignment, its frequency with respect to the Superframe, and service duration for the data burst.

The AP may then update the EB with the newly assigned SRA. The AP shall announce in the EB and the Resource Allocation Response (collectively or individually) the creation of all SRAs. It shall also announce the creation of connections for the destination STAs.

The modification of an assigned SRA may be achieved by sending a Resource Allocation Request message to the AP with Resource Index field set to the assigned value and all other fields modified as desired. This can be done in three ways. Firstly the modification can be carried out using an MSRA. Secondly the Resource Allocation Request message may be piggybacked on data within an SRA. The corresponding response may be piggybacked on data from AP in the SRA and would take effect in the next superframe. Another method would be to support this message exchange in an ORA.

The termination of an assigned SRA may be achieved by sending a Resource Allocation Request message to the AP with Resource Index field set to the assigned value and all other fields set to null or zero. Only the originating STA may terminate an established SRA.

A supplemental SRA is a one time allocation that may be set up by including the setup information in the header of the last message transmission from the AP to the STA in the given SRA. For a downlink traffic stream, the AP can piggyback the resource allocation information on the data packet. For uplink, the AP may piggyback this supplemental SRA information on a data packet. Supplemental SRA information may be actual allocation information or an indication to listen in certain ORA.

SRA locations in the IEEE 802.11n period of the superframe are specified in the EB. SRA location information can be modified after N EBs. The number N can be based on at least one of the application and system requirements. This reduces the overhead in EB. In the presence of legacy CP, the information must be sent every EB. This is to ensure that legacy beacon drift can be handled by the EB.

Figure 6:
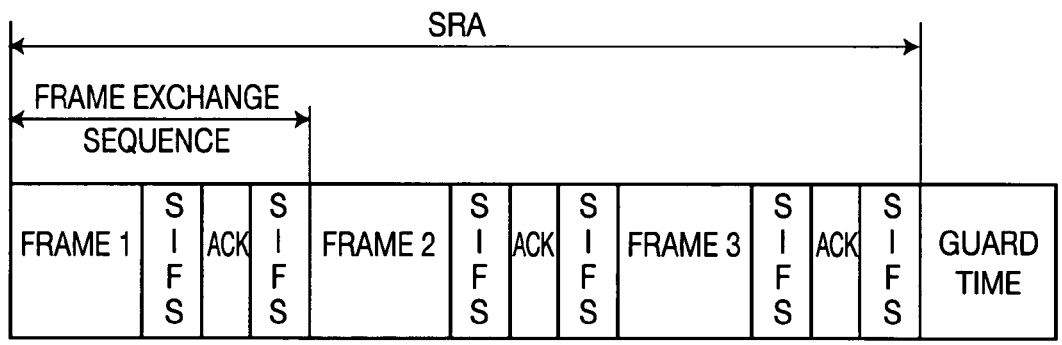
FIGS. 6 and 7 are block diagrams of exemplary frame exchange sequences with and without ACK, respectively, in accordance with the present invention.
Figure 7:
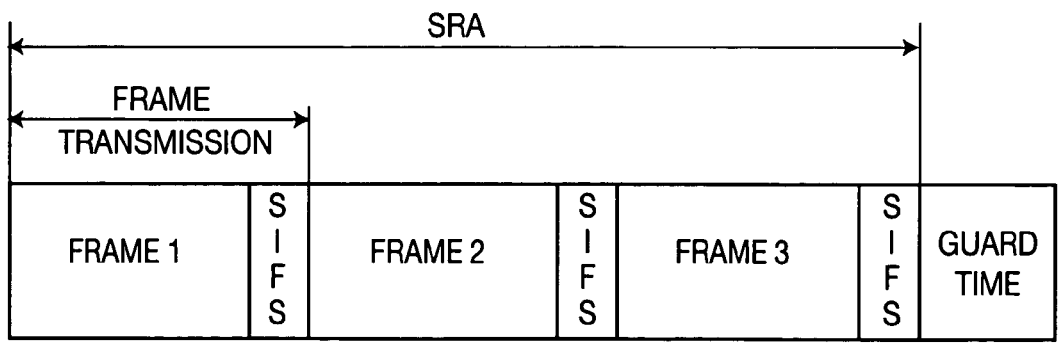

In an assigned SRA the originating STA may initiate transmissions of one or more frame exchange sequences, with all such sequences and frames within sequences separated by a short interframe space (SIFS) interval for continuous packet transmission or by other defined intervals between a packet and an ACK. An STA may only send PHY layer information if it has no data to sent. The AP can use it to learn channel state information between the AP and the STA. FIGS. 6 and 7 are block diagrams of frame exchange sequence examples with or without ACK, respectively, in accordance with the present invention.

The RC shall ensure that the duration of any assigned SRA meets the standard requirements of maximum contention free duration (dot11CFPMaxDuration) and maximum dwell time (dot11MaxDwellTime) so that non-AP STAs may use the assigned SRA without checking for these constraints. Within these limitations, all decisions regarding what MSDUs and/or MPDUs are transmitted during any given SRA are made by the STA that has been assigned the SRA.

During its assigned SRA when the STA receives a frame addressed to it and requires an acknowledgement, it shall respond with an acknowledgement (ACK) independent of its NAV. During an SRA assigned to the STA, the STA can initiate a frame exchange sequence independent of its NAV.

Any unused portion of an assigned SRA is returned to the RC. If an STA has no traffic to send in the SRA assigned to it, or if the MSDU is too long to send within the assigned SRA, the STA shall send an end of transmission indicator. If there is no transmission in an assigned SRA from the corresponding STA, the AP grabs the wireless medium after a DCF interframe space (DIFS) period (greater than SIFS period) and uses it as an ORA.

ORA allows a non-contention based access during which associated STAs may exchange data packets with the AP. It is typically set up by the AP in otherwise unassigned portions of the superframe or even in unused SRAs. The AP coordinates the data exchange during ORA in both downlink and uplink directions. In the uplink direction, the AP achieves this by assigning transmit opportunities to STAs. The contents of the packets exchanged can be control packets or data packets. The transmissions can be unicast, multicast or broadcast transmissions.

ORA can be assigned to a set of Connection IDs and/or STAS. This information is sent in the EB. The AP controls the data transmission and reception during this mode.

Some applications for ORA are as follows: An AP may send data packets to any STA and the STA may respond with a data packet or ACK. To participate in an ORA, the STA should listen during the ORA. The AP may broadcast or multicast messages or may multiplex different STAS. The STAs that are serviced in the ORA will be defined in an EB. The AP can send an aggregated downlink transmission to one or more STAs. The STA may receive control information from the AP or may send control information such as channel feedback An SRA assignment is used to transmit one or more frame exchange sequences with the only restriction that that the final sequence shall not exceed the SRA duration limit. RMCA shall not be used to transmit MSDUs belonging to an established traffic stream (after being accepted by the RC for scheduling and assignment of SRAs) unless it is permitted to do so by appropriate setting of the Access Policy subfield of the TS Info field in the resource allocation notification IE.

The superframe structure from the legacy MAC has been retained in the MAC of the present invention. Especially, in the presence of legacy service there is a beacon, CFP and CP as in legacy. When legacy support is not enabled, the beacon, CP, and any legacy support in the CFP become optional.

Comparison with legacy functions.

The RC frame exchange sequences can be used among STAs mainly in the IEEE 802.11n period within the CFP (as in PC used in PCF). However, it differs from PC and HC in several ways although it may optionally implement the functionality of a PC or HC. The most significant difference is that the RC assigns SRAs of a specified duration to non-AP STAs and also MSRAs of various types for management functions.

The RC may also operate as a PC providing CF-Polls and/or a HC providing QoS(+)CF-Polls to associated CF-Pollable STAs using the frame formats, frame exchange sequences, and other applicable rules for PCF and HCF Signaling and features of MAC to support various types of physical layer is explained hereinafter.

The MAC supports measurement frames for various physical layer needs, including received field strength, interference levels, channel information and transmitter calibration. The AP can instruct the STA to measure interference, received receive strength signal indicator (RSSI) (from other APs) in a particular channel (can be other than the channel of the AP). The AP can send signals for path loss measurement. The transmitted packet will contain the transmitted power whereas the response frame will contain the received power. These measurements are scheduled in ORA to send and receive small calibration frames. Physical layer or another mechanism, implemented in the AP or elsewhere, may indicate via some interlayer messaging to MAC the type and number of measurements required.

For AP transmitter calibration, the AP may use STAs to aid in it's calibration. A STA in turn sends a request in open MRA for its transmit antenna calibration. The AP let it calibrate its transmitter in regular MRA and/or open MRA. Typical fields in the packet sent for calibration are measurement type set as TX calibration and the STA ID. The response contains RSSI information for every measurement request for a non-MIMO station and channel parameters for MIMO capable STA.

Support for beam steering devices is provided as follows: The AP or STA can indicate that they are in a beam steering mode. Special packets can be used for picking the correct beam similar to the measurement signals for antenna calibration.

The AP is allowed to send the timing information back to the STA. An AP can detect the timing information from the offset from slotted Aloha slots. This information may be useful for OFDMA or 20 MHz/40 MHz system.

The AP and STA may contain certain physical characteristic or the bits that can be used to indicate and distinguish AP from STA.

The information regarding the MIMO capability of the AP may be sent as additional fields in the legacy beacon (where such information is not necessary for its decoding). MIMO capability parameters may be sent as physical layer quantities on the EB. Other parameters may be sent as EB MAC information which may contain an indication whether or not the AP is MIMO capable and the details of the MIMO capability. STAs send their MIMO capability information in the association message.

A MAC header contains optional IE about channel feedback information such as channel quality and channel state. This information may be sent as a separate packet or piggybacked on a data packet and/or IEEE 802.11 ACK packets. Optionally, some of these parameters may be sent as physical layer information.

The HARQ capabilities are exchanged during association request and response. However, the HARQ may only be setup for certain application or channel type. Hence, it can be piggy backed on the BW request packet and response. Packets are provided to initiate HARQ in the middle of an application. This is done to follow the philosophy used for Block ACK in current IEEE 802.11e standard.

HARQ feedback information can be sent as a separate packet or piggybacked on a data packet. Some information although generated and received by the MAC may be better protected than user data (for example, using better coding or lower order modulation) or may be separately coded and interleaved.

Resources (i.e. time and/or frequency) are assigned to a user or a set of different users. A channel may be assigned for few milliseconds after every few 10's or 100's of milliseconds based on latency requirement of the application. Also, in the case of background application (NRT traffic), the channels are assigned based on the availability. The resources will not be assigned continuously over the duration of the application for any OFDM based IEEE 802.11 systems. However, the channel estimation is required for MIMO to operate efficiently.

An AP (or a STA) sends a PHY layer SYNCH and Preamble for channel information. There is no need to send the MAC packet as the resource is specifically assigned to a STA or set of STAs. If the resources are assigned to more than one STA, the STAs do not send the PHY layer information for channel estimation. The details can be negotiated during the resource allocation request and response. A PHY header can use one of the reserved bits to indicate that there is no MAC packet following the PHY.

An STA can listen to the packet before its scheduled time to get the channel estimation information from the packets sent to other STAs. This would require decoding source address information from the MAC header. It can also be done if the PHY header has some identification that the transmission is from the AP.

Figure 8:
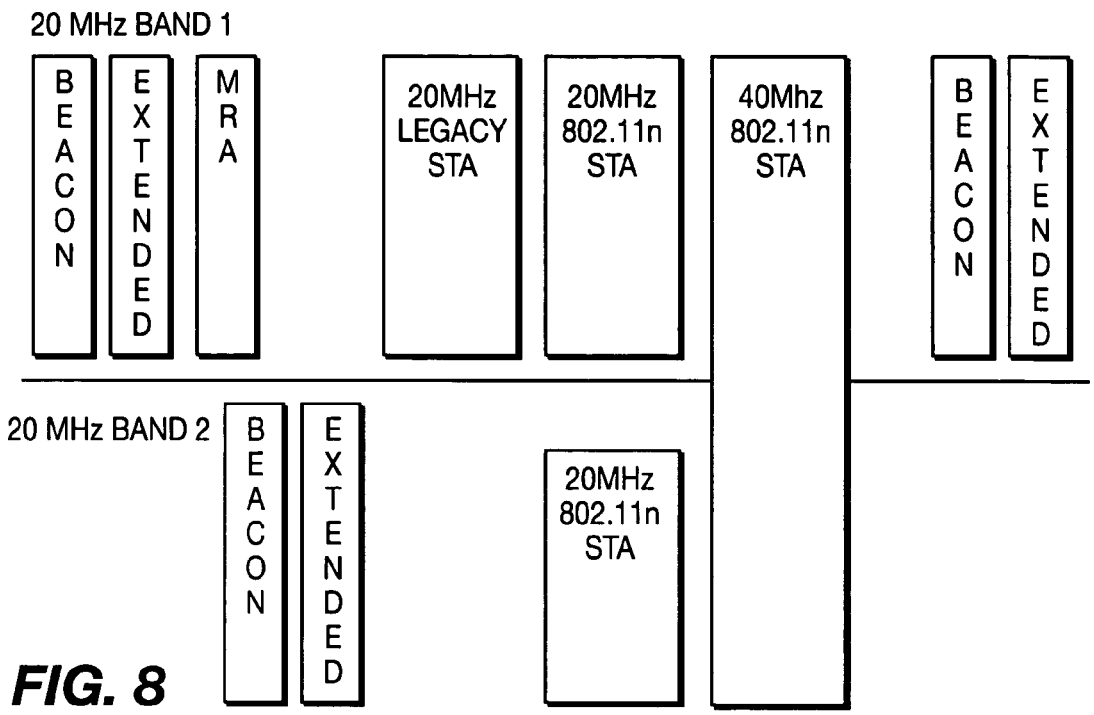
FIG. 8 is a diagram of beacon and EB transmission in accordance with the present invention.

An AP may need to support 20 MHz Legacy, 20 MHz IEEE 802.11n and 40 MHz IEEE 802.11n devices. FIG. 8 is a diagram for beacon and EB transmission in accordance with the present invention. An AP sends an EB in both of the adjacent 20 MHz bands. The EB can be sent at the same time or staggered over time. However, the resource allocation information may be different in the two beacons depending on 20 MHz or 40 MHz operation.

Each device listens to the beacon in its own 20 MHz band. The EB informs them of the details of scheduled transmissions and contention period. The AP may need to some smart scheduling to support two 20 MHz device in different bands at the same time. In order to avoid interference from the two adjacent 20 MHz band, the AP may have to ensure transmit and receive to/from the two STAs should happen at the same time. Optional IE in MAC header of all the frames is provided to schedule the ACK transmissions at a given time (instead of sending IEEE 802.11 ACK within SIFs time).

Each device listens to any of the 20 MHz EB. Both the EBs send the same information for 40 MHz device about their scheduled transmission and/or contention period.

Figure 9:
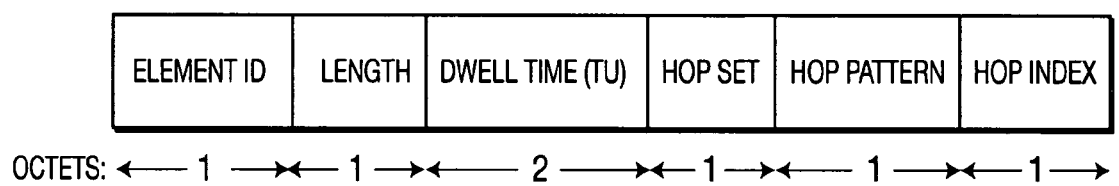
FIG. 9 is a block diagram of an IE for frequency hopping in accordance with the present invention.

IEEE 802.11 standards have defined a frequency hopping (FH) system. The FH Parameter Set defined in Beacon element contains the set of parameters necessary to allow synchronization for STAs using a FH PHY. The information sent in the Beacon is shown in FIG. 9. The information field contains Dwell Time, Hop Set, Hop Pattern, and Hop Index parameters. There are 3 hopping sequence sets with 79 hop patterns and 77 hop index (divided among the 3 hopping sequence set). The FH dwell time is decided by the MAC. The recommended dwell time is 19 time slots (around 20 msec).

Beacon contains the information of its own hopping between the non-overlapping or overlapping frequency of 20 MHz BW. This may require that the Beacon be sent more frequently on all the frequencies. This is different than what is in the standards. Each channel has 1 MHz band separated from the other channel by 1 MHz. The frequency hopping information is sent during association or resource allocation response to STAs. The hopping pattern may apply to any STA to AP or STA to STA data exchange. With this scheme, the frequency is optionally changed only for some STA instead of continuously frequency hopping, and rapid hopping improves QoS when latency requirements are tight.

In accordance with the present invention, the MAC optionally supports packet forwarding. One or several nodes may forward the packet. The concept of forwarding can be useful for MESH networks or improving the packet error rate (PER) for the destination node. In addition to traditional mesh techniques where the destination node receives the relay packet, a mode is allowed in which the destination node gets more than one copy of the same packet.

In the current IEEE 802.11 system, a packet can have more than one destination address. Forwarding for IEEE 802.11n can be enabled by the following methods:
1) When To DS and From DS fields are not both '1' then the currently unused Address 4 field in the MAC header may be used for the intermediate address in packet forwarding.
2) An information bitmap may be added to indicate the address of destination and forwarding node. Forwarding node sends the packet again.
3) A packet may have more than one destination address while not being indicated as a multicast packet. In this case, there can be pre-decided position for the destination node such as the first or the last address in the address fields.

Resource allocation methods support allocating resources between forwarding node and destination node. This can be done by using following steps. Indication is made in the packet during resource allocation that the traffic stream requires forwarding from another node. Information, (such as QOS, required data rate or the like), is sent for setting up the resource between forwarding node and destination node. After resources have been set, the source node sends a packet. The designated relay receives it and retransmits it after SIFS delay. The packet may optionally be re-coded before retransmission. The receiving node returns an ACK after receiving the relayed packet. The ACK is returned using the same mechanism or optionally directly not through the relay.

Frame formats. The frame formats that needs to be modified or added for the IEEE 802.11n MAC layer is disclosed hereinafter.

In the Table 1, modified (in italics) and new frames are listed according to the type and subtype.

TABLE 1

| Type value b2 | Type description | Subtype value b6 b6 b5 b4 | Subtype description |
|---|---|---|---|
| 00 | Management | 0000 | Association Request |
| 00 | Management | 0010 | Reassociation Request |
| 00 | Management | 1000 | Beacon |
| 00 | Management | 1110 | Extended Beacon |
| 00 | Management | 1111 | Reserved |
| 01 | Control | 0000-0011 | Reserved |
| 01 | Control | 0110 | Resource allocation request |
| 01 | Control | 0111 | Resource allocation response |

Note that even though some of the new frames are listed under control type, they may as well be categorized as management type. They are currently listed under control type since there is only one more management subtype value that is reserved.

Two control frames are added to support resource allocation request and resource allocation response for IEEE 802.11n STAs.

Figure 10:
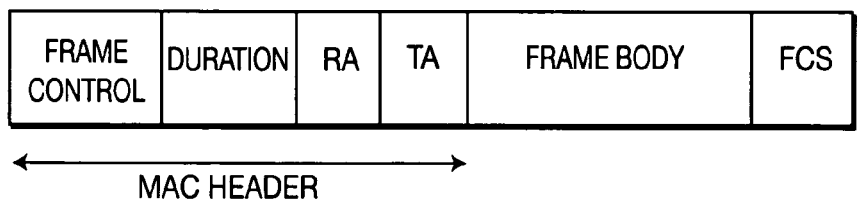
FIG. 10 is a block diagram of a resource allocation request (RAR) frame in accordance with the present invention.
Figure 11:
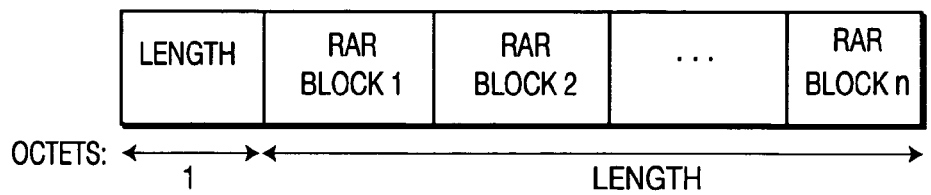
FIG. 11 is a block diagram of a frame body of the RAR frame in accordance with the present invention.
Figure 12:
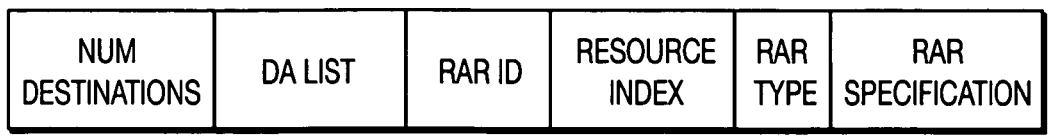
FIG. 12 is a block diagram of each RAR block in accordance with the present invention.

The RAR message is used to request, modify or terminate resource allocation for all types of data, (i.e., NRT and RT). The RAR frame structure is shown in FIG. 10. The frame body of the RAR frame contains information is shown in FIG. 11. The length field corresponds to the length of the RAR blocks to follow (there can be more than one from an STA). Each RAR block has a structure as shown in FIG. 12. Number of Destinations indicates the number of Receiving STAs (Unicast/Multicast) sought by the transmitting STA.

Destination Address list specifies the addresses of the receiving STAs. RAR ID is the identification number of the RAR. Resource index is an identification number for a Resource Allocation. RAR Type indicates whether the SRA is dynamic or quasi-static. RAR Specification is an IE specifying the QoS requirement of the resource request.

Figure 13:
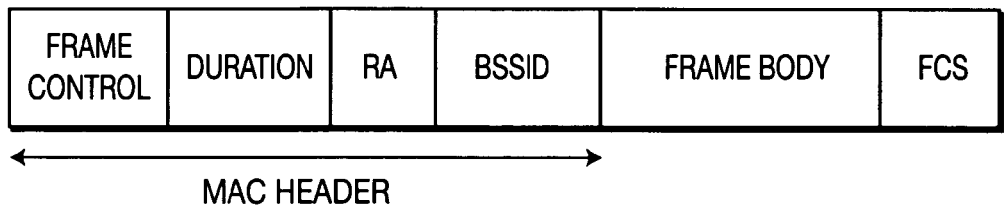
FIG. 13 is a block diagram of a resource allocation response frame in accordance with the present invention.
Figure 14:
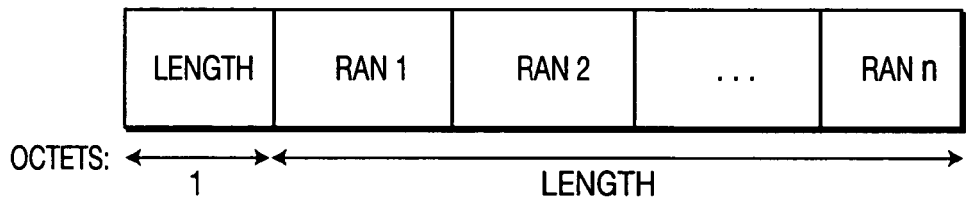
FIG. 14 is a block diagram of a frame body of the resource allocation response frame in accordance with the present invention.

The resource allocation response message is used to respond to RAR, modification or termination of resource allocation for all types of data. The frame structure is shown in FIG. 13. The frame body of the resource allocation response message is shown in FIG. 14. The resource allocation notification (RAN) IE contains information on the allocated resource. There are two options. First, the resource allocation response is a response to an individual resource allocation request which can be done contiguously in time for several STAs thereby eliminating the guard time overhead between two resource allocation responses. Second, it can also be done as a bulk response (when the RA field is set to broadcast) to the STAs that made a resource allocation request. This is efficient in reducing overhead but incurs the cost of decreased reliability since there is no ACK for broadcast/multicast.

Figure 15:
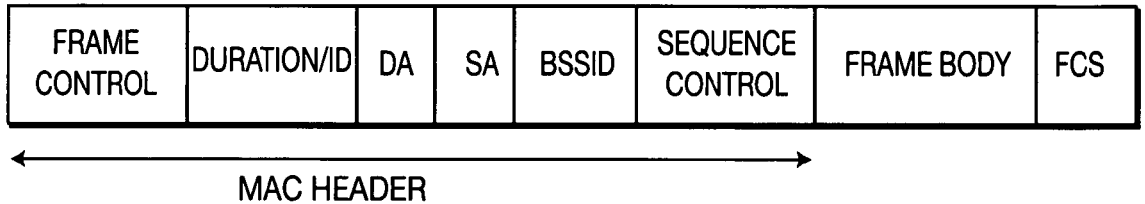
FIG. 15 is a block diagram of a general management frame in accordance with the present invention.

Management frames have a general format, which is shown in FIG. 15, with the type subfield in the frame control field set to management.

When an SRA already allocated is freed up it may be assigned to another traffic stream.

The Association/Reassociation request messages are modified to include MIMO capability, subcarriers for pilot tone pattern and Device Type indicating power saving capability. This information can be accommodated using the reserved bits in the capability field of the existing Association/Reassociation request message. Reassociation can be to a new AP.

The beacon frame has the frame format of a management frame with subtype set to Beacon in the frame control field. A pointer to the EB for IEEE 802.11n STAs is added to the existing beacon. The frame body contains information as shown in Table 2 with the modification in bold font.

TABLE 2

| Order | Information | Notes |
|---|---|---|
| 1 | Timestamp | |
| 2 | Beacon interval | |
| 3 | Capability information | |
| 4 | SSID | |
| 5 | Supported rates | |
| 6 | FH Parameter Set | The FH Parameter Set IE is present within Beacon frames generated by STAs using frequency-hopping PHYs. |
| 7 | DS Parameter Set | The DS Parameter Set IE is present within Beacon frames generated by STAs using direct sequence PHYs. |
| 8 | CF Parameter Set | The CF Parameter Set IE is only present within Beacon frames generated by APs supporting a PCF. |
| 9 | IBSS Parameter Set | The IBSS Parameter Set IE is only present within Beacon frames generated by STAs in an IBSS. |
| 10 | TIM | The TIM IE is only present within Beacon frames generated by APs. |
| 14 | QBSS Load | The QBSS Load IE is only present within Beacon frames generated by QAPs. The QBSS Load element is present when dot11QoSOptionImplemented and dot11QBSSLoadImplemented are both true. |

TABLE 2-continued

| Order | Information | Notes |
|---|---|---|
| 15 | EDCA Parameter Set | The EDCA Parameter Set IE is only present within Beacon frames generated by QAPs. The EDCA Parameter Set element is present when dot11QoSOptionImplemented is true and the QoS Capability element is not present. |
| 23 | QoS Capability | The QoS Capability IE is only present within Beacon frames generated by QAPs. The QoS Capability element is present when dot11QoSOptionImplemented is true and EDCA Parameter Set element is not present. |
| 50 | Extended Beacon | The Extended beacon IE is only present within Beacon frames generated by APs supporting IEEE 802.11n. |

The EB frame has the frame format of a management frame with subtype set to EB in the frame control field. The frame body contains information shown in Table 3.

TABLE 3

| Order | Information | Notes |
|---|---|---|
| 1 | Timestamp | (Legacy Information)Time stamp is a Fixed field representing the value of TSF TIMER |
| 2 | SSID | (Legacy Information)SSID IE indicates the identity of an ESS or IBSS |
| 3 | Supported Rates | (Legacy Information: optional if beacon present)Supported Rates IE specifies the rates in the Operational Rate Set |
| 4 | FH Parameter Set | (Legacy Information: optional if beacon present)The FH Parameter Set IE is present within Beacon frames generated by STAs using frequency-hopping PHYs. |
| 5 | DS Parameter Set | (Legacy Information: optional if beacon present)The DS Parameter Set IE is present within Beacon frames generated by STAs using direct sequence PHYs. |
| 6 | CF Parameter Set | (Legacy Information: optional if beacon present)The CF Parameter Set IE is only present within Beacon frames generated by APs supporting a PCF. |
| 7 | IBSS Parameter Set | (Legacy Information: optional if beacon present)The IBSS Parameter Set IE is only present within Beacon frames generated by STAs in an IBSS. |
| 8 | TIM | (Legacy Information: optional if beacon present)The TIM IE is only present within Beacon frames generated by APs. |
| 9 | OFDM MIMO Parameter Set | OFDM MIMO IE specifies OFDM MIMO PHY related information |
| 10 | CP Access | CP Access IE specifies permission and legacy PHY information for IEEE 802.11n STAs to contend in the legacy Contention Period |
| 11 | SRA Schedule | SRA Schedule IE mainly specifies the SRA time schedule for the Superframe |
| 12 | MSRA Schedule | MSRA Schedule IE contains the MSRA schedule, MSRA Type and MSRA Type specific information for the Superframe |
| 13 | ORA Schedule | ORA schedule IE contains the Open SRA schedule for the superframe |
| 14 | Channel Information | Current Channel of AP |
| 15 | New STA Allowed | True (default). AP can advertise that it is not supporting any new STAs. |

The management frames of subtype Action are used for measurement request and response packets, QoS (IEEE 802.11e support), or the like in the current IEEE 802.11h and IEEE 802.11e standard. The Action frames are used for antenna calibration, extended DLP messages, channel feedback information, and HARQ setup.

Following action frames are added under the DLP category:

1.) DLP Discovery Request: QSTA sends the packet to AP to get the MAC address of the device by sending application requirements.

2.) DLP Discovery Response: AP responds back with MAC address of the device.

3.) DLP Teardown by AP: Add Action field for DLP Teardown by the AP. The frame has an information filed called timer. AP expects that QSTA sends the DLP teardown message to QAP within that time.

4.) DLP Measurement Request: Add action item value for DLP Measurement Request from the QAP 3315 to the QSTA 3305. It contains the capability information of QSTA 3310.

5.) DLP Measurement Response: Add action item value for DLP Measurement Response from the QSTA 3305 to the QAP 3315. It contains measurement information and the MAC address of the QSTA 3310.

DLP Request frame is modified to include additional element to send optimal PHY data rate and certain other channel characteristic between two STAs.

A new category for starting HARQ process is created in the Action frames in accordance with the present invention. There are two types of action fields, HARQ Request and HARQ Response. The details of the HARQ parameter can be filled later based on the agreed upon parameter by the standard. Some of the parameters include, but are not limited to, Resource ID, H-ARQ indication, H-AQR ACK delay, and scheme of coding and modulation used. The initiating information can also be piggybacked in the resource allocation and request packet.

A new category for measurements is created as follows.

1.) Initial Antenna Calibration.

In the measurement category, action fields are defined for antenna calibration request and response packet. The response packet may be sent instead of the IEEE 802.11 ACK. The response packet contains RSSI information or channel state information.

2.) Beam Steering Measurements.

In the measurement category, action fields are defined for beam steering calibration request and response packet. The response packet may be sent instead of the IEEE 802.11 ACK. The response packet contains RSSI information or channel state information. The action field may have a subfield about the indication of start and end of beam steering. This can be used if the STA or AP wants to inform the other side of running beam steering by using actual data packets instead of beam steering measurement packets.

3.) Timing Offset Message.

An AP can measure the timing offset of the STAs due to propagation delay in slotted Aloha period. AP will send the timing offset information to the STA. It is used by the STA to adjust its time with respect to the EB.

4.) Measurement Information:

In the measurement category, action fields are defined for measurements. These fields indicate RSSI and Interference measurement request and Response. They contain a subfield with channel identity.

Channel Information such as channel quality and channel state need to be send to the transmitter side at certain frequency. Also, HARQ ACKs need to be sent either synchronously or asynchronously based on the HARQ setup parameters. This information can be sent in the MAC header as optional IE piggybacked over data or as a separate packet.

Management frame body components.

Fixed fields.

Timestamp of the EB (similar to that in the beacon) is included so that STAs have another opportunity to synchronize. It represents the value of the time synchronization function (TSF) timer.

Figure 16:
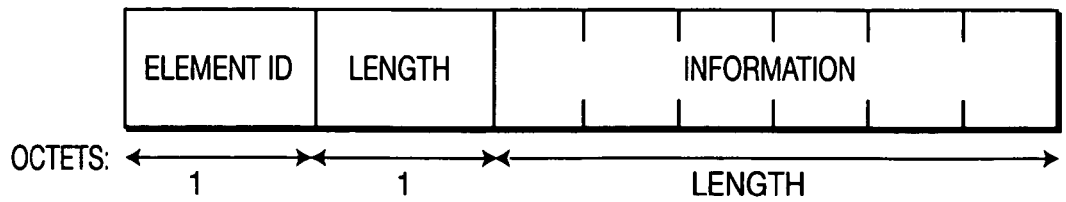
FIG. 16 is a block diagram of a frame body of the management frame in accordance with the present invention.

IEs are variable length frame body components in the Management and Control frames. IEs have a general format, shown in FIG. 16, comprising a 1 octet Element ID field, a 1 octet length field and a variable-length element-specific information field.

The set of valid IEs to support the modifications and new additions to MAC frames is given in Table 4.

TABLE 4

| Information element | Frame |
| --- | --- |
| SSID | Beacon, Extended Beacon |
| Supported Rates | Beacon, Extended Beacon |
| OFDM MIMO Parameter Set | Extended Beacon |
| CP Access | Extended Beacon |
| Extended Beacon | Beacon |
| RA Schedule | Extended Beacon |
| MRA Schedule | Extended Beacon |
| Resource Allocation Request Specification | Resource Allocation Request |
| Resource Allocation Notification | Resource Allocation Response |
| H-ARQ Bitmap | Hybrid ARQ Acknowledgement Response |
| H-ARQ Request Control | Hybrid ARQ Acknowledgement Initiation |
| CQI Control | Channel Information |
| CSI Control | Channel Information |

The Service Set Identity (SSID) element and Supported Rates element are the same as in the beacon.

Figure 17:
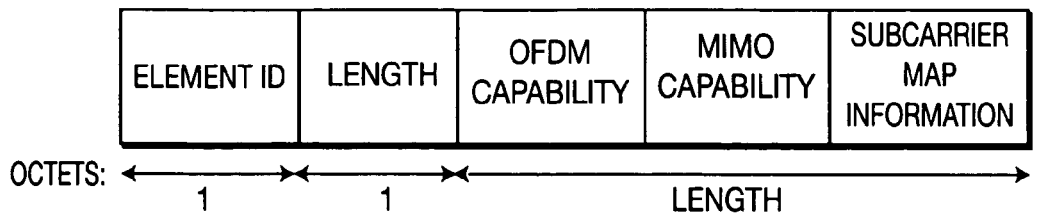
FIG. 17 is a block diagram of an OFDM MIMO Parameter Set element in accordance with the present invention.

OFDM MIMO Parameter Set element is shown in FIG. 17. OFDM Capability field has OFDM PHY support information. MIMO Capability field has information on support for MIMO. Subcarrier Map information specifies subcarriers for pilot tones and association.

Figure 18:
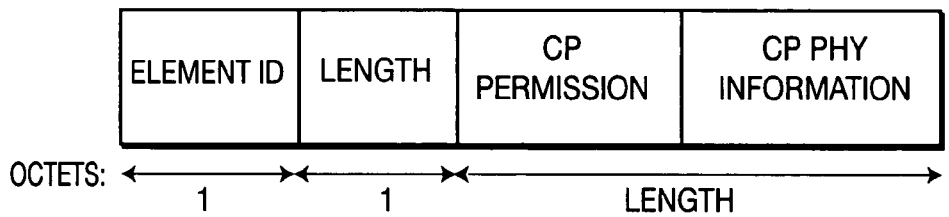
FIG. 18 is a block diagram of a CP Access element in accordance with the present invention.

CP Access element is shown in FIG. 18. CP permission field indicates whether or not a IEEE 802.11n STA can contend in the legacy contention period. CP PHY information provides the legacy PHY information for use in preamble for backward compatibility.

Figure 19:
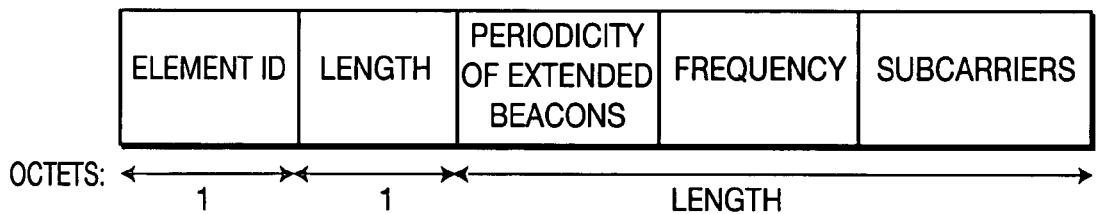
FIG. 19 is a block diagram of an EB element in accordance with the present invention.

The EB element, shown in FIG. 19, indicates information about periodicity, frequency band, and subcarriers for the EBss.

Figure 20:
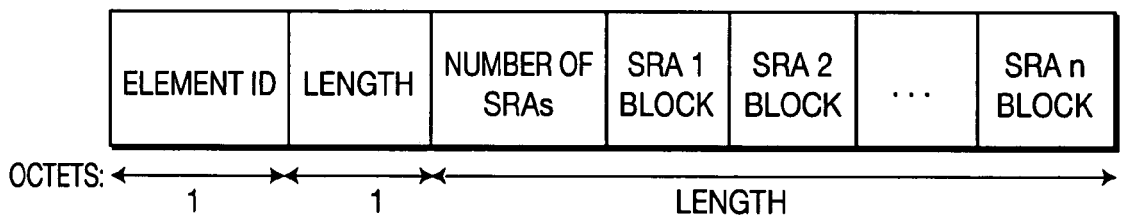
FIG. 20 is a block diagram of an SRA Schedule element in accordance with the present invention.

The SRA Schedule element, shown in FIG. 20, contains information on, number of SRAs in the IEEE 802.11n period and with corresponding SRA blocks of information.

Figure 21:
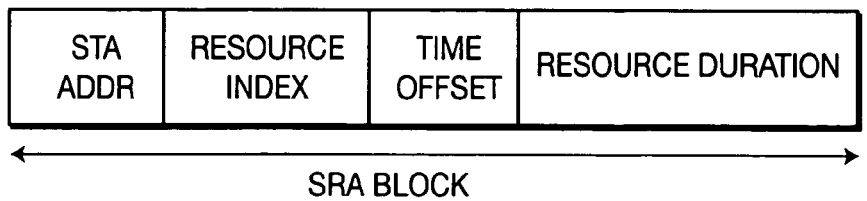
FIG. 21 is a block diagram of an SRA Block IE in accordance with the present invention.

Each SRA Block IE corresponds to a scheduled resource allocation and specifies the SRA with Resource index, time offset, STA address, and Resource duration. It is defined as shown in FIG. 21.

Figure 22:
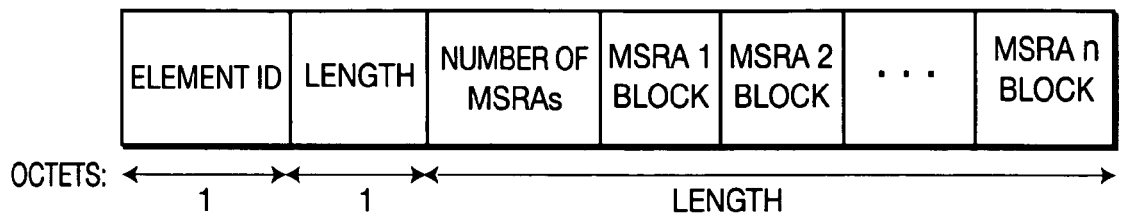
FIG. 22 is a block diagram of an MSRA schedule element in accordance with the present invention.
Figure 23:
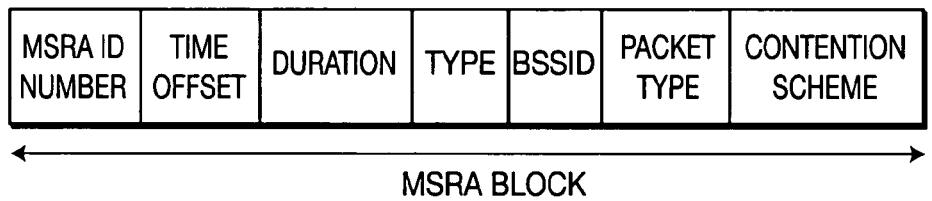
FIG. 23 is a block diagram of an MSRA Block element in accordance with the present invention.

The MSRA schedule element specifies the number of MSRAs in the IEEE 802.11n period and with corresponding MSRA blocks of information. It is defined as shown in FIG. 22. Each MSRA Block corresponds to a management scheduled resource allocation and provides the MSRA identification number, time offset, duration, type (Unassociated and/or Associated), BSSID, packet type (control or data), contention scheme (slotted Aloha or CSMA/CA) as shown in FIG. 23.

Figure 24:
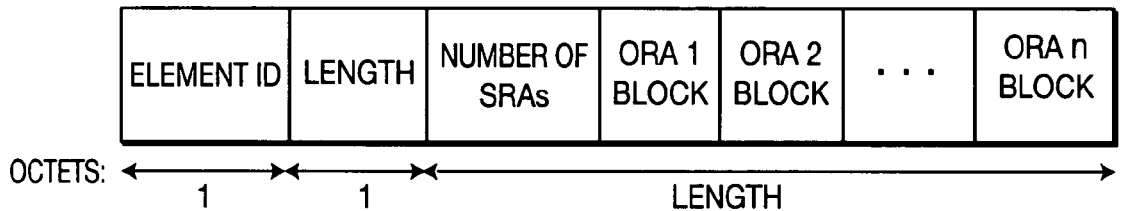
FIG. 24 is a block diagram of an ORA Schedule element in accordance with the present invention.

The ORA Schedule element contains information on, number of allocated ORAs in the IEEE 802.11n period and with corresponding ORA blocks of information. It is defined as shown in FIG. 24.

Figure 25:
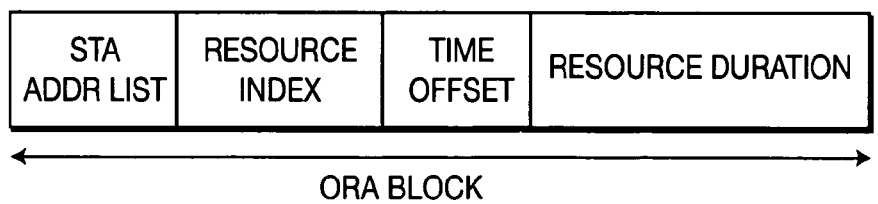
FIG. 25 is a block diagram of each ORA Block IE in accordance with the present invention.

Each ORA Block IE, which is shown in FIG. 25, corresponds to an open resource allocation and specifies the ORA with Resource index, time offset, STA address list, and Resource duration.

Figures 26, 27, 28:
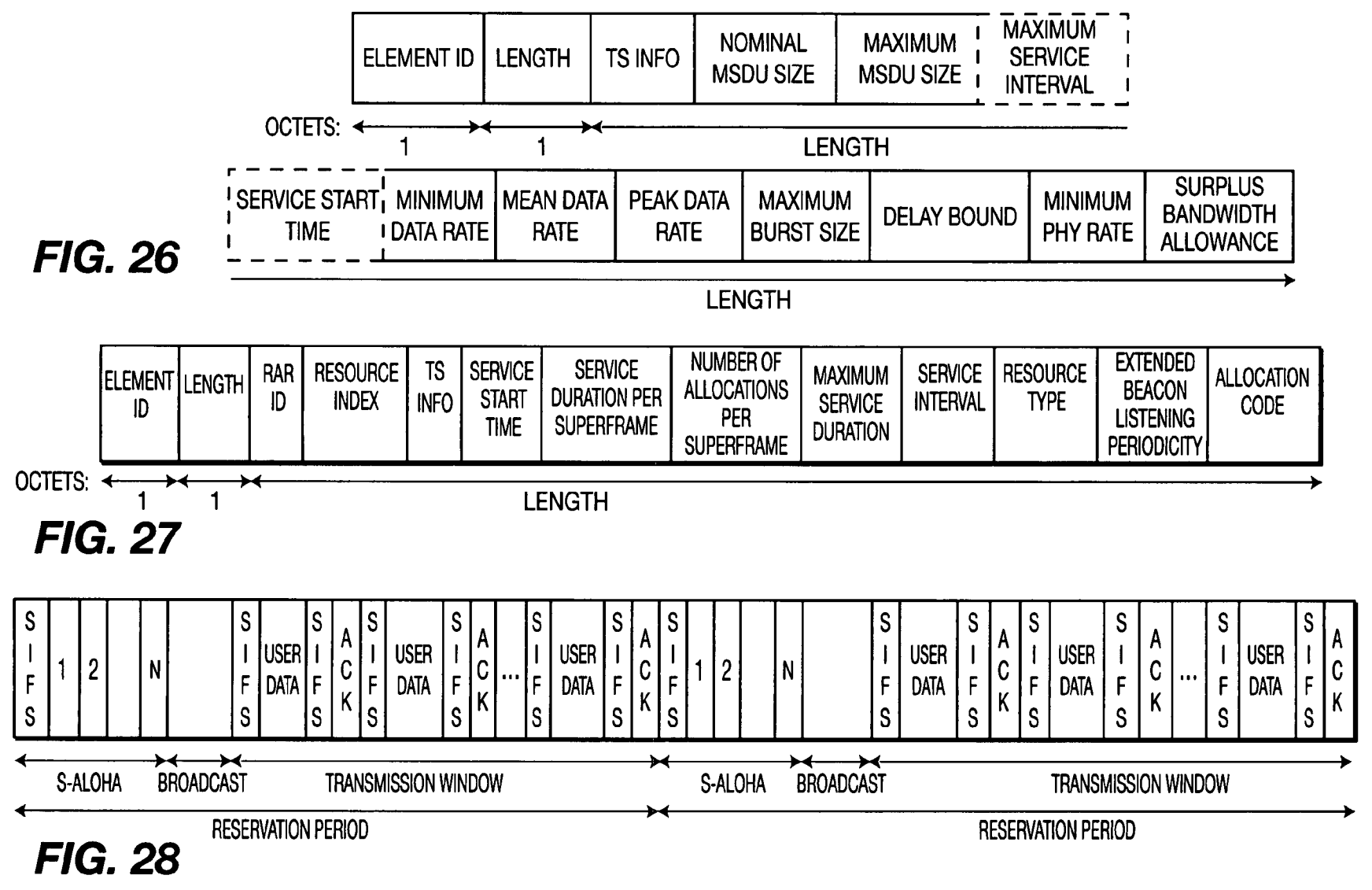

The RAR Specification IE includes the QoS parameters for the requested resource allocation. It has a structure as shown in FIG. 26. The set of parameters defined in the RAR specification IE are more extensive than may be used or needed; unused fields are set to null using a message bitmap.

The RAR Type field determines the format of the RAR Specification field information element. If RAR Type is Quasi-static then the RAR Specification IE will include most of the fields. However, if RAR Type is dynamic then the RAR Specification IE may have those fields that are not used set to zero. TS Info field contains information on Traffic Type (NRT, RT), direction, MAC ACK policy, Access policy (RMCA and/or RSCA) or the like. Nominal MSDU size specifies nominal size in octets of the traffic. Maximum MSDU size specifies maximum size in octets of the traffic. Maximum Service Intervals is the maximum duration between two successive service periods. Service start time indicates to the AP the time when the STA would be ready to send frames. Minimum Data Rate is the lowest data rate specified at the MAC SAP for transport of MSDUs for this traffic. Mean Data Rate is the mean data rate specified at the MAC SAP for transport of MSDUs for this traffic. Peak Data Rate is the maximum allowable data rate for the transfer of MSDUs. Maximum Burst size specifies the maximum burst of the MSDUs that arrive at the MAC SAP at the peak data rate. Delay bound is the maximum time allowed for the transport of an MSDU from arrival at local MAC sublayer and completion of successful transmission or retransmission to the destination. The Minimum PHY rate specifies the desired minimum PHY rate for this traffic. The Surplus Bandwidth Allowance indicates the excess allocation to account for retransmissions.

The Resource Allocation Notification IE includes the response for the requested resource allocation. It has a structure as shown in FIG. 27. RAR ID is the identification number for the RAR. Resource index is the identification for the Resource Allocation. TS Info field contains information on MAC ACK policy, Access policy (RMCA and/or RSCA) or the like. Service Start Times specifies the offsets for the beginning of allocations (can be more than one for certain traffic types such as voice) within a superframe. Service Duration per superframe is the allocated time in a superframe (Beacon Interval). Number of allocations per Superframe is the number of equal allocations into which the service duration per superframe is divided. Maximum Service Duration specifies the allocation over several superframes. Resource Type indicates whether the allocation is Quasi-static or dynamic. EB listening periodicity specifies how often the STA needs to list to the EB for timing information. The allocation code gives information on whether or not the allocation was successful and under what conditions.

The performance of MAC in accordance with the present invention is compared with the current IEEE 802.11e MAC for NRT Applications. Most of the NRT applications such as Internet File transfer, web browsing and local file transfer or the like are considered background and Best effort services. The resources will not be assigned continuously for these applications either in IEEE 802.11e or in accordance with the present invention. The current IEEE 802.11e MAC provides AP and STA same priority for Background and Best Effort services. It is well known that the downlink throughput at the AP is low compared to uplink throughput at the STAs in the IEEE 802.11e MAC. The present invention provides AP with higher priority to co-ordinate transmission and reception of data packet. Although any simulations results for downlink throughput numbers are not provided, it is obvious that the MAC of the present invention will not be unfair to the downlink traffic. Also, the present invention improves the uplink throughput compared to IEEE 802.11e. IEEE 802.11e and the present invention are simulated for bursty uplink traffic.

In the simulation a specific packet error rate is assumed. Different error rates apply to data packets and ACK packets, due to their different sizes. Moreover, for the MAC of the present invention, a different error rate applies to the reservation packets transmitted in the Aloha part.

In the simulation certain percentage of hidden links is assumed. Link is defined as the path between two STAs. For example, in a system with 12 users there are 66 links, and 7 links are assumed to be hidden. For the case of 4 users, there are 6 links, and one link is assumed to be hidden.

The packet generation follows a Poison process. The mean is chosen so that it yields the desired application data rate. TCP between the traffic generator and the MAC have not been simulated. However, the assumption of exponential inter-arrival times provides burstiness in the NRT data packet generation.

The load is increased in the system by two different methods. In one method, the number of users is kept constant. But, the average data rate is increased for each user until the system becomes unstable. In the other method, data rate is kept constant, but the number of users is increased until the systems become unstable.

The details of IEEE 802.11e is out of scope of this invention. The simulator has all the required IEEE 802.11e MAC functionalities. The parameters used for simulation are given in Table 5.

In the simulation, the time is divided in reservation periods, each reservation period contains an S-Aloha part, a broadcast channel part and a transmission window. This is shown in FIG. 28. In this system, collisions might occur in the S-Aloha part. In the simulation, the allocation scheme follows the First In First Out (FIFO) rule. However, fair scheduling algorithms should be considered in real implementations. If the request is received by the AP, the user will not resend the request, unless there is a change in the user's buffer. The request remains in the AP "request queue".

The time of each slot in the slotted Aloha includes SIFs+ transmission time of request packet of size 50 bytes.

TABLE 5

| Parameter | Value |
| --- | --- |
| Number of Users | Variable |
| Application Data Rate | Variable |
| PER (Data Packet) | 0 |
| PER (ACK) | 0 |
| PER (S-Aloha Packet) | 0 |
| MAC PDU Size (bytes) | 1500 |
| MAC Header Size (bytes) | 50 |
| Request Packet Size (slotted Aloha) (bytes) | 50 |
| ACK Size (bytes) | 30 |
| ACK Transmission Rate (Mbps) | 54 |
| Data Transmission Rate (Mbps) | 120 |
| Physical Layer Preamble (us) | 20 |
| Maximum Number of Retransmissions | 4 |
| PER (Data Packet) | 0 |
| PER (ACK) | 0 |
| PER (S-Aloha Packet) | 0 |

TABLE 5-continued

| Parameter | Value |
| --- | --- |
| SIFS (us) | 10 |
| DIFS (us) | 34 |
| Minimum Contention Window (slots) | 16 (for IEEE 802.11e) 10 (for S-Aloha) |
| Maximum Contention Window (slots) | 256 (for IEEE 802.11e) 40 (for S-Aloha) |
| Transmission Opportunity | 1 or 3 |
| Slot Size (us) | 9 (for IEEE 802.11e) 14.81 (for S-Aloha) |
| Number of Slots | 10 |
| Reservation Period (ms) | 7 |
| Reservation Transmission Rate (Mbps) | 54 |
| Broadcast Information (bytes) | 550 |
| Broadcast Data Rate (Mbps) | 54 |
| % of Hidden Node | 0, 10, 20 |

The goal of the simulations delay is to determine the average throughput for a given acceptable delay and the average transmission delay for all users in the system. The delay is determined defined as the difference between the time the packet is successfully received by the AP and the time the packet arrived at the user's buffer. The average delay is determined for all the packets transmitted from all users. The throughput is defined as the total number of bits successfully transmitted over the entire simulation divided by the total simulation time. The total simulation time for all our simulations was approximately 150 seconds.

Figure 29:
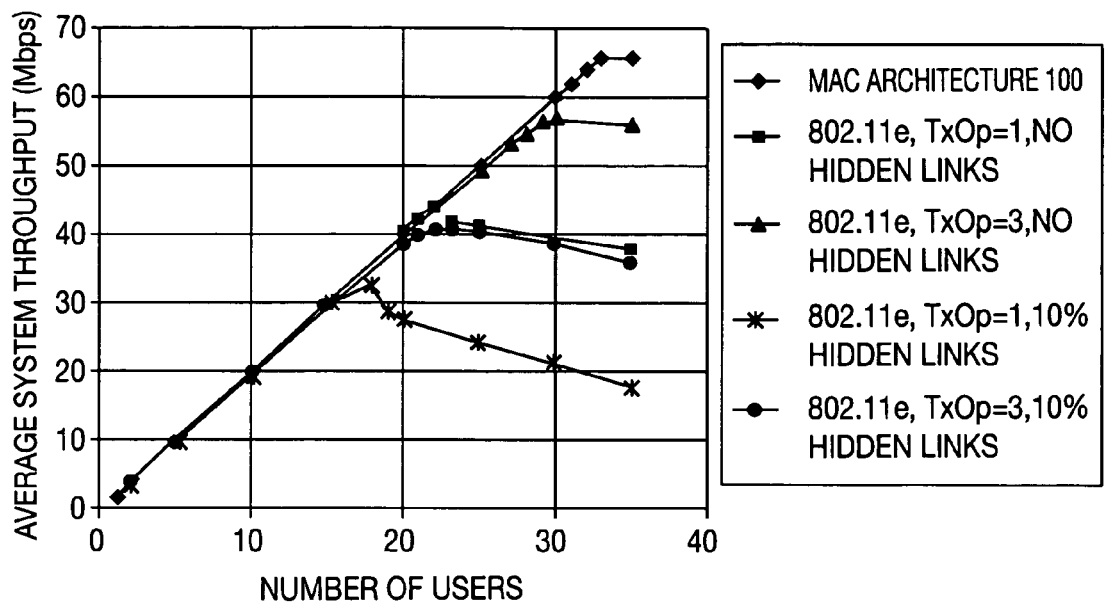
FIG. 29 is a diagram of simulation results for throughput comparison.
Figure 30:
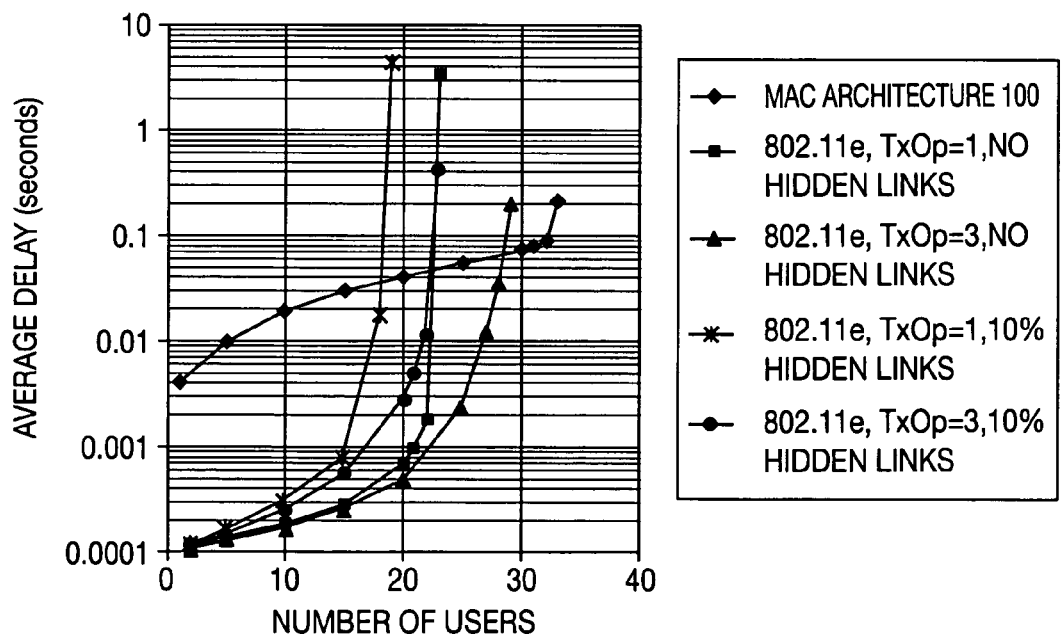
FIG. 30 is a diagram of simulation results for average delay.

In the simulation, it is assumed that an application data rate is 2 Mbps for each user and the delay and the throughput were determined for different number of users in the system. It is also assumed that the packet error rate to be zero. The curves for throughput and average delay are shown in FIGS. 29 and 30, respectively. As the number of users in the system increases, the delay increases until the system becomes unstable. When the queue starts building up, the delay starts growing exponentially, and the system becomes unstable. The delay curve shows the maximum number of users that can be supported before the system become unstable (the delay values for unstable system are not meaningful and not shown). For the MAC of the present invention, total of 32 users each at 2 Mbps is supported. For an IEEE 802.11e system without hidden nodes, the users supported are 22 and 28 for number of packets/transmission opportunity equal to 1 and 3, respectively. For an IEEE 802.11e system with 10% hidden links, the users supported are 18 and 22 for transmission opportunity equal to 1 and 3.

Considering all overhead in the system (i.e., inter-frame spacing, headers, preambles and acknowledgments), the maximum achievable throughput is 55% of the offered bandwidth, which is approximately 66 Mbps (for an assumed physical layer raw data rate average of 120 Mbps). With 32 users, the throughput is approximately 64 Mbps, which is close to the maximum achievable. The only limitation in the present invention is the available bandwidth limitation.

However, in an IEEE 802.11e system, the limitation is not only due to the bandwidth limitation, but also because of collisions, especially in the case where there are hidden nodes. As the probability of hidden nodes increases, the system capacity decreases. For 10% hidden links, IEEE 802.11e supports 44 Mbps. This means that the present invention provides 60% gain in throughput (from 40 Mbps to 64 Mbps) over IEEE 802.11e.

The gain comes with a penalty of a small increased delay. One of the causes of the increase in delay is that the users need to wait an average of 3.5 ms in order to send a request for bandwidth to the AP (since the reservation period is equal to 7 ms). However, these delays are in the order of few tens of millisecond to a maximum of 100 millisecond depending on the offered load. This is not a significant delay for NRT services running as background for best effort traffic.

System Capacity (in Terms of Average User Throughput).

Figure 31:
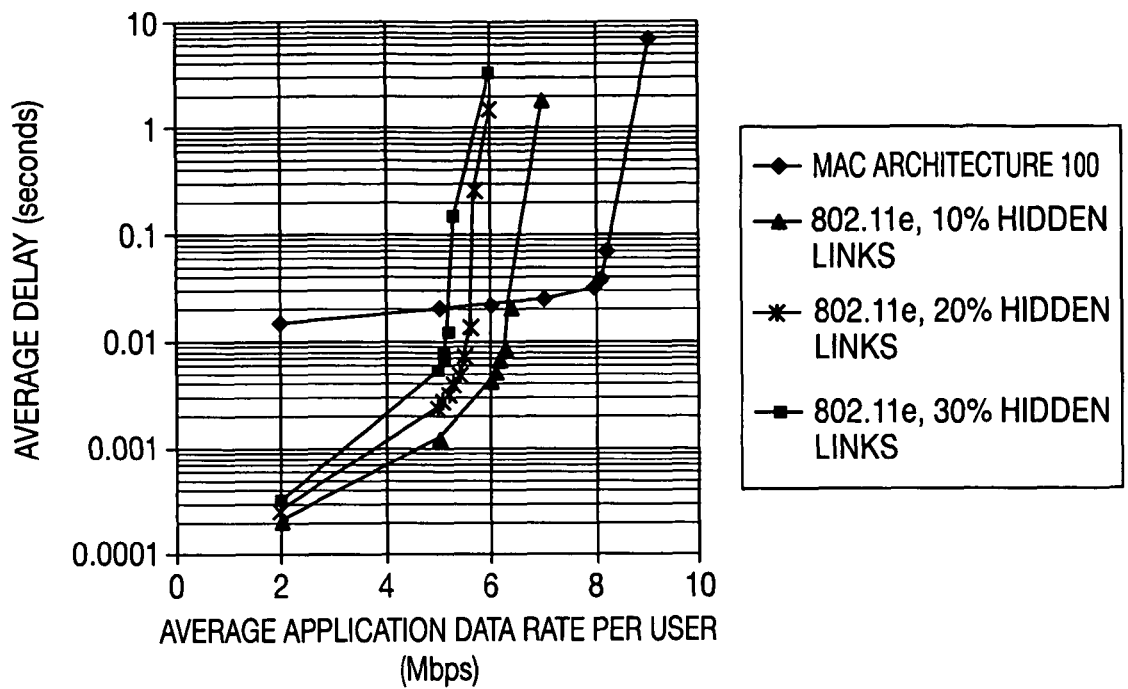
FIG. 31 is a diagram of simulation results for average delay vs. application data rate for eight (8) users.
Figure 32:
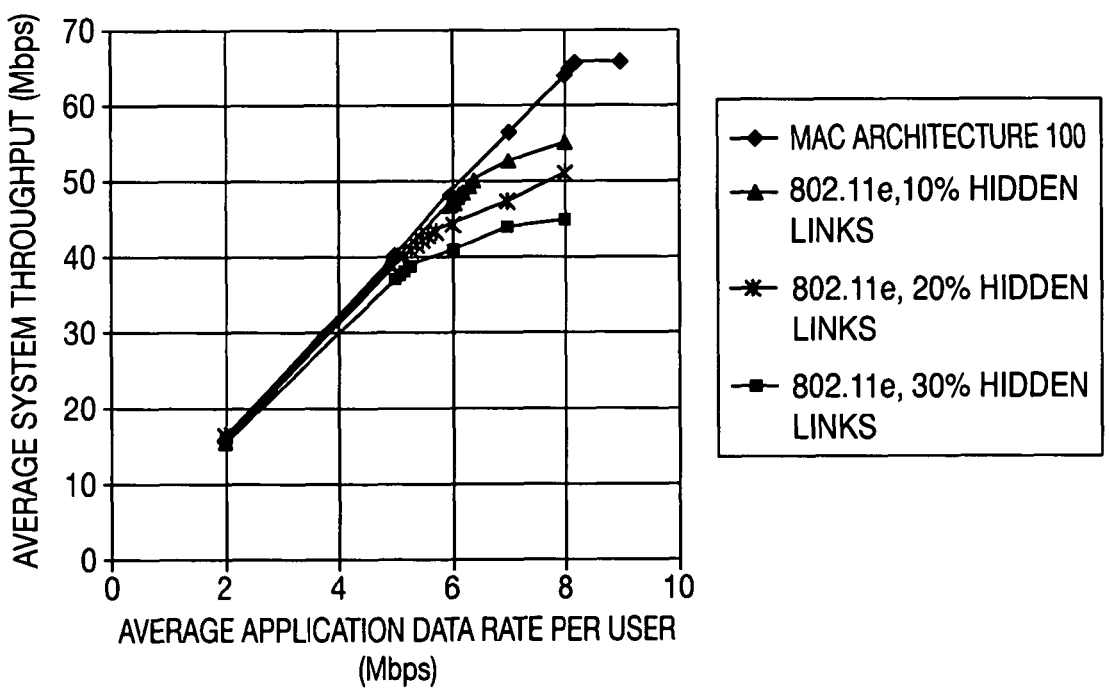
FIG. 32 is a diagram of simulation results for average system throughput vs. application data rate for eight (8) users.

After fixing the number of users and varying the application data rate of each user, the objective is to find out, for a given number of users in the system, what the maximum supported data rate per user is. The percentage of hidden links is assumed to be 10%, 20% or 30%. The transmission opportunity is equal to 3 in all cases. The results for 8 users are shown in FIGS. 31 and 32.

For 8 users, the present invention can support 8.2 Mbps application rate per user. For an IEEE 802.11e system, the maximum data rate that can be supported is 6.3 Mbps, 5.5 Mbps and 5.2 Mbps per user for the case of 10%, 20% and 30% hidden links, respectively.

Similar simulation was done for 12 users. The present invention can support 5.4 Mbps application rate per user. For an IEEE 802.11e system, the maximum data rate that can be supported is 4.1 Mbps, 3.6 Mbps and 3.3 Mbps for each user for the case of 10%, 20% and 30% hidden links, respectively. There is a small penalty in delay in order to get these higher data rates. An improvement in throughput is 31% to 58% for 8 users and 31% to 64% for 12 users.

The present invention provides guaranteed QOS for RT services. IEEE 802.11e can support RT services on EDCA or HCCA mode. In EDCA, RT services get higher priority than background and best effort (mainly NRT services) but no guaranteed QoS. AP and STA both contend for resources. However, AP has slightly higher priority than STA. The RT services on EDCA service have similar performance numbers as shown above. In HCCA, RT services are setup by polling the STA at certain interval based on the QOS negotiation during setup. HCCA can provide guaranteed QOS, but, it needs to send a poll packet to initiate uplink packet transfer. STA needs to respond back with a data packet or IEEE 802.11ACk packet within a SIFs time. Also, the STAs need to listen continuously even to send some information once every 100 millisecond (such as video on Demand). The present invention not only provides guaranteed QOS, but, also does not require STA to be awake all the time. The STA supporting only RT service can save battery by an amount that depends on the characteristic of the application. (STA only need to be awake to listen for extended beacon and/or SRA. The present invention is approximately 10% to 25% more efficient in uplink for low data rate high latency application (such as VoIP) as it does not require a poll packet for every uplink transfer IEEE 802.11e MAC may become less efficient if the STA AMC is unable to send the data packet in response to a poll within a SIFs period. This imposes a stringent requirement on the AMC turn around time which cannot happen in our MAC, STAs are aware of the scheduled transmissions and/or reception at the beginning of the superframe.

The present invention is also applicable to peer-to-peer communication. In general, STAs are not allowed to transmit frames directly to other STAs in a BSS and should always rely on the AP for the delivery of the frames. However, STAs with QoS facility (QSTAs) may transmit frames directly to another QSTA by setting up such data transfer using Direct Link Protocol (DLP). The need for this protocol is motivated by the fact that the intended recipient may be in power save mode, in which case it can only be woken up by the QAP. The second feature of DLP is to exchange rate set and other information between the sender and the receiver. Finally, DLP messages can be used to attach security information elements.

Figure 33:
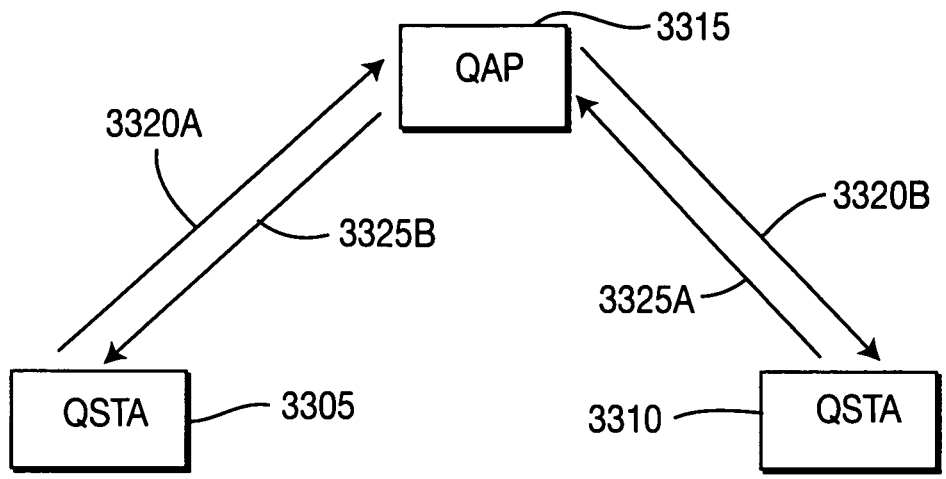
FIG. 33 is a block diagram of direct link protocol (DLP) signaling in accordance with the present invention.

Messaging procedure to setup DLP is explained. FIG. 33 is a block diagram of DLP signaling. The message exchange to start DLP between two QSTAs 3305, 3310 follows the following fours steps:

1.) A station 3305 that intends to exchange frames directly with another non-AP station 3310, invokes DLP and sends a DLP Request frame 3320A to an AP 3315. This request contains the rate set, and capabilities of QSTA 3305, as well as the MAC addresses of the QSTAs 3305, 3310.
2.) If the QSTA 3310 is associated in the BSS, direct streams are allowed in the policy of the BSS and the QSTA 3310, the AP 3310 forwards the DLP request 3320B to the recipient, STA 3310.
3.) If STA 3310 accepts direct streams, it sends a DLP-response frame 3325A to the AP 3315, which contains the rate set, (extended) capabilities of the QSTA 3310 and the MAC addresses of the STAs 3305, 3310.
4.) The AP 3315 forwards the DLP-response 3325B to the QSTA 3305, after which the direct link is established.

DLP teardown can be initiated by either of the two QSTAs 3305, 3310. It cannot be initiated by the QAP 3315. The QSTAs 3305, 3310 can teardown DLP due to expiry of inactivity time expiry or completion of the application. Each QSTA 3305, 3310 restarts a timer after every packet reception (data or ACK) from the other QSTA 3305, 3310. If there are no packets received within the timer expiry, the QSTA 3305, 3310 will send the message to the QAP 3315 for DLP teardown. All the packets henceforth should be sent through the QAP 3315.

Both of the QSTAs 3305, 3310 may use Direct Link for data transfers using any of the access mechanisms defined in the standard. The QSTAs 3305, 3310 may also set up Block ACK if needed. If needed, the QSTAs 3305, 3310 may set up traffic streams with the HC to ensure they have enough bandwidth or use polled transmit opportunities (TXOPs) for data transfer. A protective mechanism (such as transmitting using HCCA, using RTS/CTS or the mechanism described in 9.13 of the IEEE 802.11e standard) should be used to reduce the probability of other stations interfering with the direct link transmissions.

The QSTA 3305 uses following steps to get polled while DLP is setup with another QSTA 3310. After the completion of DLP setup (defined in previous paragraphs), the QSTA 3305 negotiates with the QAP 3315 (HC, hybrid coordinator) to gain TXOP that it will use to send the data. There is no negotiation between QSTA 3305 and the QSTA 3310 regarding capabilities during this period. This time is solely negotiated by the QSTA 3305 and the QAP 3315. The QOS Action frame is used by the QSTA 3305 to send the request for traffic stream (i.e. time) and QOS Action frame is used by the QAP 3315 to respond back to the request. It is assumed that the traffic class is setup after DLP setup as it is logical way of negotiating BW once the two STAs have exchanged capabilities.

The QAP 3315 polls the QSTA 3305 after a certain interval based on the negotiated mean data rate and maximum service interval. The QSTA 3305 uses this TXOP to transmit and receive packet from the QSTA 3310. However, the QSTA 3305 sends the first packet to ACK the poll from QAP 3315. It then sends the packets to the QSTA 3310 which may respond back with a DATA+ACK packet. There can be more than one data transfer every TXOP.

After the DLP setup, the QSTAs 3305 and 3310 may negotiate certain BW based on EDCA rules. QOS Action frame is used for negotiation. EDCA changes the priority of different traffic class by changing the back-off window and Inter frame spacing (IFS). The negotiation decides the amount of time allowed over a certain period. The QSTAs 3305, 3310 may have to self police itself for higher priority traffic (i.e. setting of backoff window and IFS). However, the QAP 3315 or the QSTAs 3305, 3310 are allowed to send the packets (of high priority traffic) under lowest priority settings if they need. The QSTA 3305 and/or the QSTA 3310 can send data packets to each other directly based on the negotiated EDCA parameters.

The present invention sets forth the signaling required for efficient peer-to-peer communication in Ad hoc Mode, and includes improvements in the current Peer-to-Peer Communication to take advantage of the channel characteristic and providing RRM control to the AP (Infrastructure mode).

Each device maintains a database of all the devices within a hop and two hops. One hop devices are the ones that can hear, (i.e., receive signals from) each other, (hereinafter "neighbors"). Two hop devices are the one that are not heard directly. But, a neighbor can hear it.

The neighbor devices can also send signals between each other to inform capabilities. These signals can be part of an initialization process, (when the device is powered on). It can be periodic or event triggered by some activity or inactivity of any device. These signals can also be a reply to an information request signal initiated by one of the devices.

Before running an application between two devices, one or both the devices inform the neighbor about the application. This information can be sent as a broadcast and/or propagated to the second level neighbors. It can be a directed packet only between the transmitter and the receiver. There are two groups of devices that need to be told the media is in use: the ones that can hear the transmission and the ones that could possibly transmit and interfere with the reception. Therefore, only the transmitting device and the receiving device need to inform their neighbor devices. The transmitting device needs to tell its neighbors that the medium is in use and they cannot receive without interference. The receiving device needs to tell its neighbors that the medium is in use and that they should not transmit. This may require some handshaking, but it will yield better overall medium efficacy.

Possible information that can be communicated between devices include, but are not limited to, BW requirement, transmitter or receiver, frequency band, preferred modulation mode, subcarriers, MIMO enabled and code, or the like.

This information may be sent again on the request of another device. This device can ask for this information to update its statistics or to start a new application. New Device sends a broadcast message to the neighbors asking for active transmission. The device can passively scan the channels and then send directed packets as well. Upon reception of the request, any device in active section sends the information back to the new device. The devices follow a random back off before responding.

Once the new device gets this information it can decide to use this information to optimally allocate resources for starting the new application. Some services/applications will have priority over others. These services will disrupt other services (if required). An example of this service is VoIP for 911 calls.

The disruption can be done by message exchange between other transmitting nodes to stop their service; and message exchange to re-negotiate the bandwidth, sub carrier, frequency band, or the like.

Figure 34:
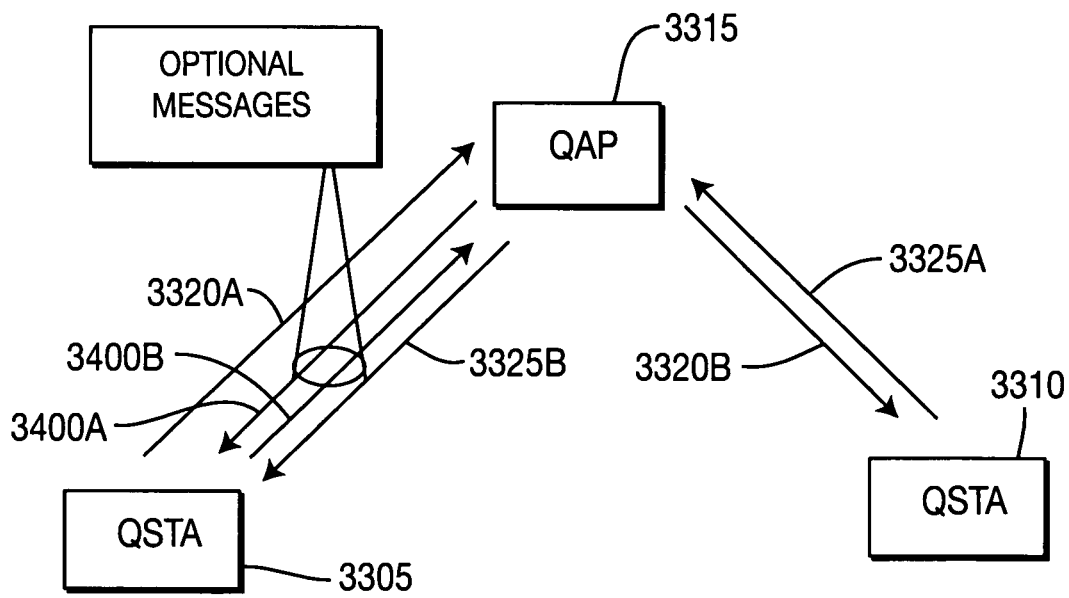
FIG. 34 is a block diagram illustrating message exchange for DLP setup in accordance with the present invention.

The present invention introduces the following steps shown in FIG. 34:

Discovery of the QSTA 3310 MAC by the QSTA 3305 (optional): If the QSTA 3305 wants to search for the QSTA 3310, it sends a message to the QAP 3315 (a message similar to Action Frame). If the QAP 3315 is aware of the QSTA 3310, it responds back with the relevant MAC information to the QSTA 3305. Otherwise, the QAP 3315 sends a failure message. This is done before DLP setup.

Message 1*a*: The QSTA 3305 sends optimal PHY rate and/or other channel quality information between itself and the QSTA 3310 in the DLP Request Packet. This information may be obtained from previous transmissions between the two QSTAs 3305, 3310, or by listening to the transmissions from QSTA 3310 (to the QAP 3315 or other QSTAs). If the information is not available, the QSTA 3305 sends the DLP Request Packet with this IE set to NULL.

Message 3320B and 3325A: Not Changed.

Message 3325B: The QAP 3315 may decide whether or not to support DLP for the QSTAs 3305, 3310 based on the channel quality between the two QSTAs 3305, 3310. If the QAP 3315 decides not to support the two QSTAs 3305, 3310 with DLP, the QAP 3315 rejects the DLP request on the grounds of inadequate channel quality (not part of messaging in the current standard).

Messages 3400A and 3400B (optional): The QAP 3315 may decide to send a DLP Packet for request on channel quality measurement to the QSTA 3305 (message 3400A). The QAP 3315 sends the information on the capability of the QSTA 3310 to the QSTA 3305. The QSTA 3305 responds back to the QAP 3315 with the channel quality measurement between the two QSTAs 3305, 3310 (message 3400B). The message 3400A and 3400B may occur before the message 3325B or during an ongoing DLP session. This will be useful to get the MIMO capability information before even the DLP setup.

Messages 3400A and 3400B are optional and will only be recognized and used for STAs and APs which support this added capability. STAs and APs compatible with only IEEE 802.11e DLP will not support messages 3400A and 3400B.

The QAP 3315 is allowed to tear down the DLP. The DLP response message is modified to allow tear down by the QAP 3315. The DLP tear down message should contain a timer after which the QSTA 3305 should send a tear down message to the QAP 3315. It allows complete backward compatibility. A QSTA that does not recognize DLP tear down message can ignore it. This can be in any access method (assigned resource allocation, management resource allocation, HCCS or EDCF).

It is the responsibility of QSTA 3305 or the QSTA 3310 to negotiate the traffic stream (i.e. resource allocation in our case). If a QSTA wants to use EDCA or HCCA, it follows the procedures defined in background section. In the present invention, data transfer has following steps:

The QSTA 3305 sends the request packet in the open MRAs. Open MRAs are contention periods for BW request by the associated STAs. The resource allocation information is sent in the broadcast following the open MRA. The Request and Response IE needs to modify to specify peer-to-peer communication and addition of the MAC address of the QSTA 3310.

Resource Allocation. It is the responsibility of the QSTA 3305, 3310 to define the QOS requirement of the application and request the BW accordingly. The QAP 3315 responds back with the BW allocation information. Typically, an RT application has resources allocated over the duration of application, whereas, an NRT application gets resources assigned on the need basis. Resource is allocated by the QAP 3315.

For an RT application, this information is broadcast in every EB. The IE contains the STA IDs of both the QSTA 3305 and the QSTA 3310. This is needed to ensure that both of the QSTAs 3305, 3310 are awake during the assigned time.

At the assigned time and/or channel, the QSTA 3305 sends the first packet to the QSTA 3310. The QSTA 3310 can respond back with the ACK or Data+ACK as negotiated between the two STAs 3305, 3310.

For NRT application, the steps are very similar. However, the QAP 3315 assigns the resource after the open MRA period is over via Resource allocation message (broadcast message). It is only assigned for a short duration to satisfy the current buffer occupancy requirement. The first packet is sent by the QSTA 3305.

A QSTA, that has background services supported over a DLP session, needs to listen to the broadcast message after the open MRAs. A QSTA, that has streaming and/or RT services supported over DLP, needs to listen for EB. The QSTA is expected to be awake in the scheduled transmissions time.

For support of channel estimation and information before or during DLP setup (optional), the QSTA 3305 can send a request packet to the QAP 3315 in an open MRA. The QAP 3315 may assign a MRA for the two QSTAs 3305, 3310 to communicate with each other. This information is sent in the next EB period. The measurement information is sent back to the QAP 3315 by the QSTA 3305 during the assigned MRA.

The QSTA 3305 can also send a packet directly to the QSTA 3310 in an open MRA with a CSMA/CA access mechanism. The QSTA 3305 can send this information in an open MRA. The measurement packets support the mechanism to get information on channel quality (CQI) and state (CSI).

In IEEE 802.11e, the QSTA 3305 sends the measurement packet to the QSTA 3310 in an EDCA and then informs the QAP 3315 about channel quality. There is no need for additional messaging to support MIMO between two QSTAs 3305, 3310 during data transfer (specifically for DLP). The channel feedback to improve MIMO data rate or PER during QAP to QSTA communication is similar to STA to STA.

Several Action frame formats are defined for DLP Management purposes. An Action field, in the octet field immediately after the Category field, differentiates the formats. The Action field values, associated with each frame format are defined in

TABLE 6

| Action Field Value | Meaning |
| --- | --- |
| 0 | DLP request |
| 1 | DLP response |
| 2 | DLP teardown |
| 3-255 | Reserved |

The following Action field Values are added.

DLP Discovery Request: QSTA sends the packet to AP to get the MAC address of the device by sending application requirements.

DLP Discovery Response: AP responds back with MAC address of the device.

DLP Teardown (modified): Action field is added for DLP Teardown by the AP. The frame has information filed called timer. AP expects that QSTA sends the DLP teardown message to QAP within that time.

DLP Request (modified): Additional element to send optimal PHY data rate and certain other channel characteristic between the two STAs.

DLP Measurement Request: action item value is added for DLP Measurement Request from the QAP 3315 to the QSTA 3305. It contains the capability information of the QSTA 3310.

DLP Measurement Response: action item value is added for DLP Measurement Response from the QSTA 3305 to the QAP 3315. It contains measurement information and the MAC address of the QSTA 3310.

BW Request Packet which contains following information: The QSTA 3310 MAC address, P2P Option, Optimal PHY data rate, BW Response Element, and alternative method of performing DLP with centralized controller.

Each device maintains a database of all the devices with which it can directly communicate and also which devices it can communicate with though an AP. The AP can provide the database of available devices available through the AP.

Each node is connected to the AP. However, all the traffic does not necessarily originate from and to the AP. In this case, the two nodes can talk to each other directly without sending the traffic through AP. There are basically two ways to control this process: AP control and distributed control similar to the non-AP case above.

Using AP control this can be done by using some or all the following steps:

Node1 sends a message to the AP with destination id, BW required, Channel information, direct hop to the destination or the like. The AP based on the received information can decide to let the two STAs talk to each other directly or through the AP. It can be based on the signal strength between the two nodes, current network load, AP activity, capability of the two nodes, or the like. The AP can decide to assign resources, (e.g., a certain time, sub-carriers or antennas for this connection), based on the requirement and what is available. This information is sent to both the Node 1 and Node2 and could be sent as directed packet. Other nodes are informed so that they are aware the resource is in use. They can be informed by broadcast to all the nodes or by requiring all nodes to monitor AP allocation information (even if it is not intended for their use). This prevents other nodes from using the same resources.

In wireless LANs the access to the medium is typically distributed. However, the AP has higher priority than non-AP STA. So the AP can therefore grab the wireless medium to administer management functions to regulate the usage and access of the wireless medium by the STAs. In the present invention, the AP grabs the wireless medium after a defined interval (e.g., DIFS in IEEE 802.11e WLAN standard) and transmits a broadcast message to all STAs indicating that a specified management resource allocation period (MRAP) shall follow for data packet exchanges and request/reservation for polled transmissions. During the MRAP a slotted Aloha mechanism provides access to the wireless medium.

In the broadcast message from the AP for MRAP, the MRAP parameters such as type, location and duration and the slotted Aloha parameters shall be included. The type could differentiate between MRAPs used for associated and unassociated STAs.

MRAPs allow associated and unassociated STAs and AP to exchange messages in a contention mode. The data exchange is typically small data packets, resource allocation requests for polled transmissions, association/reassociation requests The access mechanism for an MRAP is a slotted Aloha mechanism. In the slotted Aloha mechanism STAs access the wireless medium with short data packets (small data packets, resource allocation requests, association/reassociation requests). The wireless medium is divided into slots of size equal to the data packet duration and transmissions are allowed only at the beginning of the slots.

An exponential backoff mechanism is implemented as follows: A back off counter is maintained at each STA and is decremented every slot. A pending packet is transmitted when the back off counter becomes zero. The back off counter is chosen as a uniformly distributed random variable from a contention window. In the first attempt the contention window is set to a minimum contention window. The size of the contention window grows with the number of retransmission attempts until it reaches an upper limit. The rate at which the contention window grows may also optionally depend on the priority of the traffic. For example the smaller the access delay specification of the traffic the slower the growth of contention window. Controlling the contention window based on the access delay specification allows better management of access delays in a slotted Aloha access under high load situations.

Figure 35:
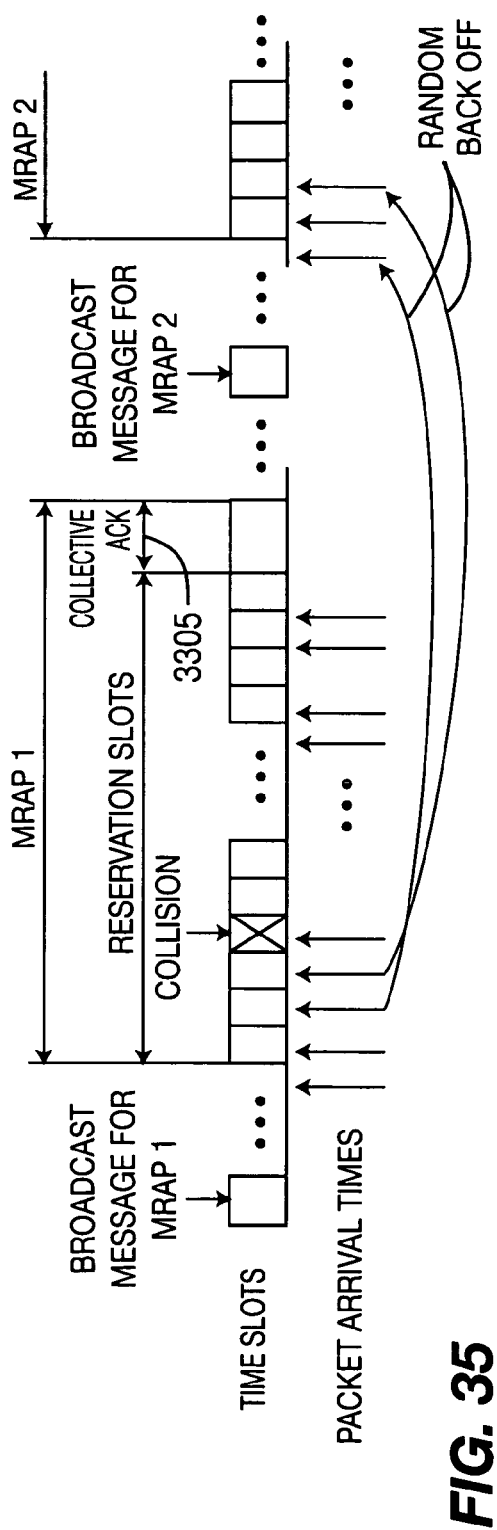
FIG. 35 is a diagram showing slotted Aloha operation with collective ACK in MRAP in accordance with the present invention.
Figure 36:
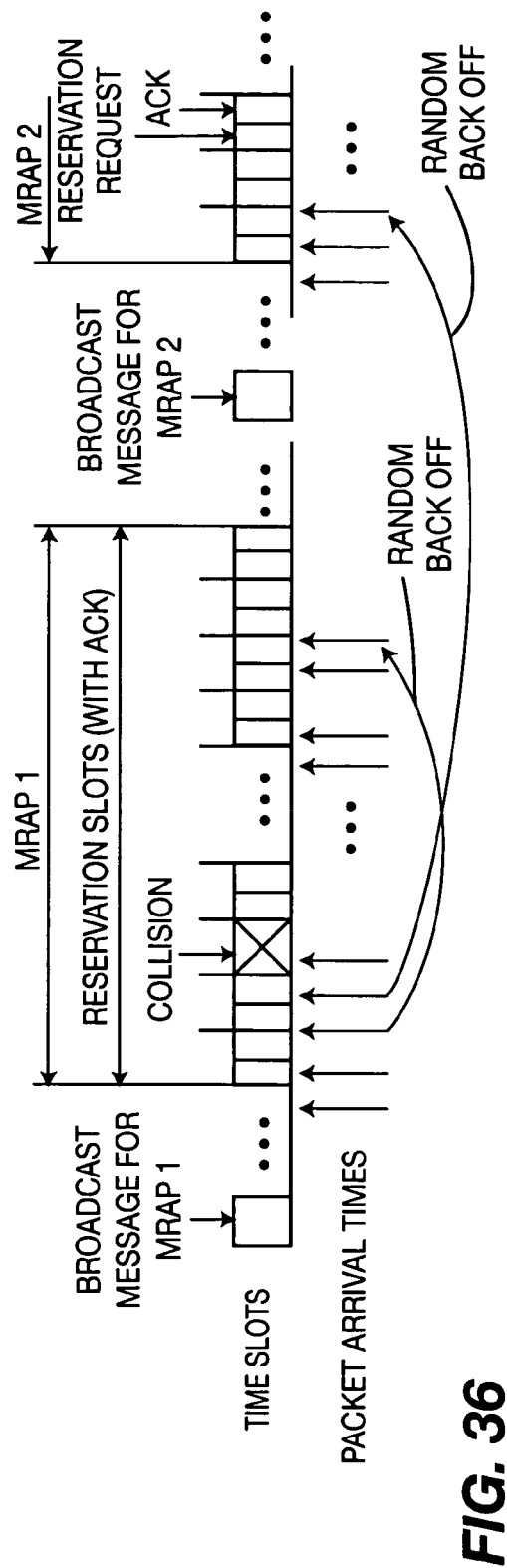
FIG. 36 is a diagram showing slotted Aloha operation with immediate ACK in MRAP in accordance with the present invention.

There are two possible methods for the AP to send acknowledgements (ACKs) to the transmissions from STAs in the reservation slots. In one method, a collective ACK frame 3505 is sent at the end of the MRAP as shown in FIG. 35. This collective (or aggregated) ACK include individual ACKs for all STAs that contented in the MRAP. In another method, a transmission from an STA in the reservation slot is immediately ACKed by the AP within the same slot as shown in FIG. 36. This method has to define the slot size to accommodate both the data packet from the STA as well as the ACK.

The responses to the STAs from the AP follow later in a polling mechanism administered by the AP. The poll from the AP would have resource allocation responses for associated STAs that successfully transmitted their resource allocation requests. It would have the association/reassociation responses for unassociated STAs that successfully transmitted their association/reassociation requests. The STAs that were unsuccessful have to retransmit their packets using the back off counter. The backoff counter is decremented only during MRAPs.

In the IEEE 802.11n period, guard times are needed to prevent transmissions in any two adjacent scheduled resource allocations (SRAs or MSRAs) from colliding. The guard time required depends upon the physical size of the BSS, the drift of the local STA time and the ideal time at the RC. The clock at the STA may be fast or slow relative to the ideal time. The propagation delay may have an insignificant impact especially for distances of suggested in IEEE 802.11n model scenarios. The RC may estimate a single worst case guard time for the entire IEEE 802.11n period or between two schedule announcements via the EBs. The RC may also calculate guard time based on the nature of SRA assignment (quasi-static or dynamic) and the position of the SRA or MSRA in the superframe. For example, the quasi-static SRA assignments may require longer guard time to keep allocations over superframes the same while accommodating small drifts in beacon times.

Admission control may be necessary to efficiently utilize the available bandwidth resources. Admission control may also be required to guarantee QoS. The RC can either implement admission control in the network or defer such admission control decisions to another entity. Admission control may be standardized by IEEE 802.11n or other groups or may be left for vendor-implementation of the scheduler. The admission control may depend on available channel capacity, link conditions, retransmission limits, and the QoS requirements of a given traffic stream. Any stream may be admitted or rejected based on all of these criteria.

Figure 37:
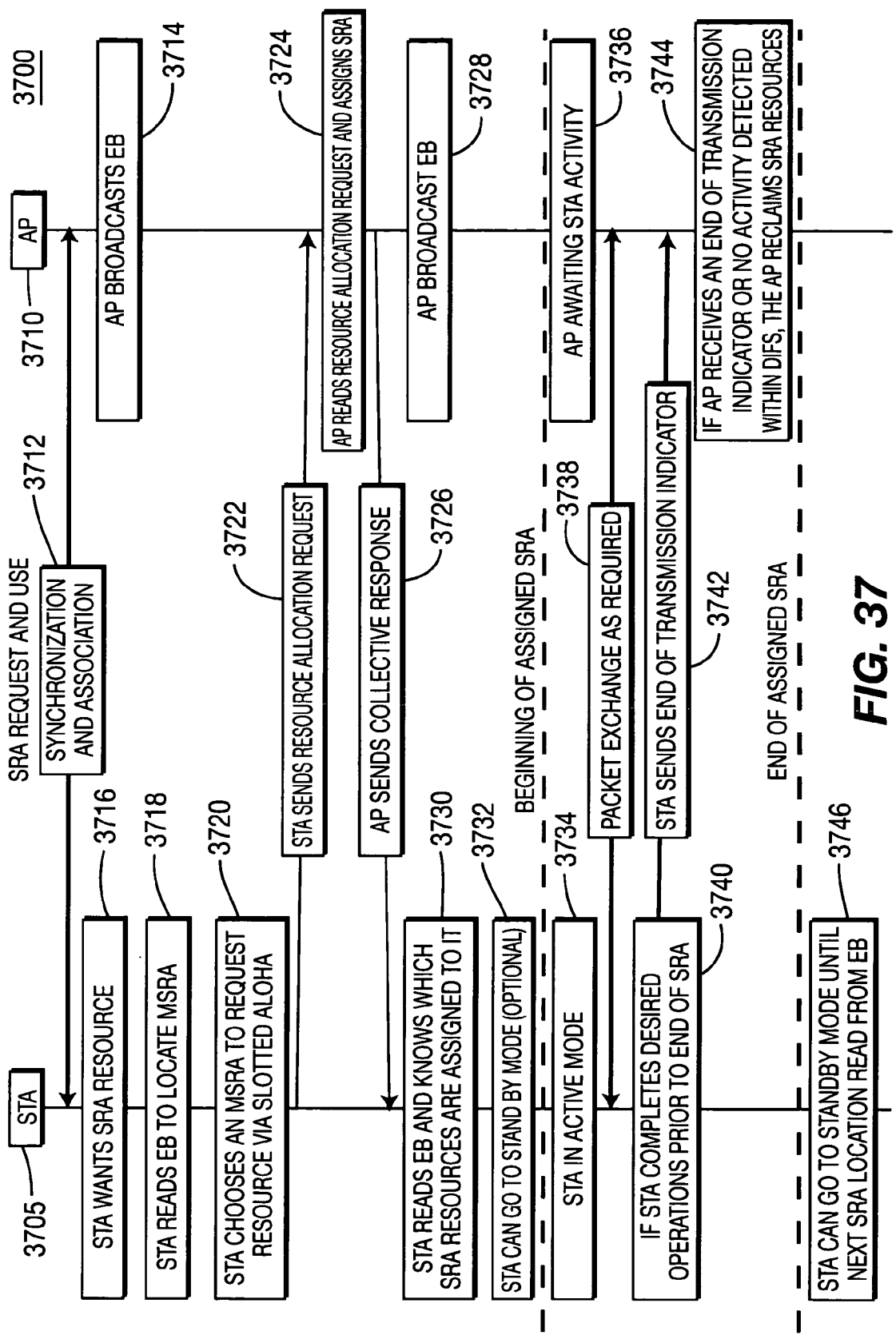
FIG. 37 is a flow diagram of a process for SRA assignment in accordance with the present invention.

FIG. 37 is a flow diagram of a process 3700 for implementing an SRA assignment in a system including at least one STA 3705 and at least one AP 3710 in accordance with the present invention. The STA 3705 obtains synchronization and association with the AP 3710 (step 3712). The AP 3710 broadcasts an EB which has information for the IEEE 802.11n STAs about the allocations in IEEE 802.11n period such as SRAs and MSRAs (step 3714).

If legacy operation is enabled, the AP 3710 begins the superframe by transmitting the legacy beacon. In the legacy beacon, the AP announces the CFP thereby preventing legacy STAs from transmitting during that period. If legacy operation is not supported the beacon need not exist.

When the STA 3705 wants SRA resources at step 3716, the STA 3705 reads EB to locate MSRA (step 3718). The STA 3705 chooses an MSRA to send a resource allocation request via a slotted Aloha mechanism (step 3720). The STA 3705 sends a resource allocation request to the AP 3710 (step 3722). The AP 3710 receives the request and assigns an SRA (step 3724). The AP 3710 then sends an acknowledgement to the STA, (individually or collectively) (step 3726). The AP 3710 then broadcasts an EB which contains the information for the SRA assignment (step 3728). The STA 3705 reads the EB and knows which SRA is assigned to it (step 3730). The STA 3705 may optionally enter a standby mode until the SRA is assigned (step 3732). The STA 3705 reenters to an active mode upon the assigned SRA beginning (step 3734) as the AP 3710 awaits for activity of the STA 3705 (step 3736). Data is transmitted on the assigned SRA (step 3738). If the STA 3705 completes the operation prior to end of the assigned SRA (step 3740), the STA 3705 sends an end of transmission indicator to the AP 3710 (steps 3742). If the AP 3710 receives an end of transmission indicator or no activity detected within DIFS, the AP 3710 reclaims the SRA resources (step 3744). The STA 3705 may enter a standby mode until a next SRA location is read from the EB (step 3746).

Figure 38:
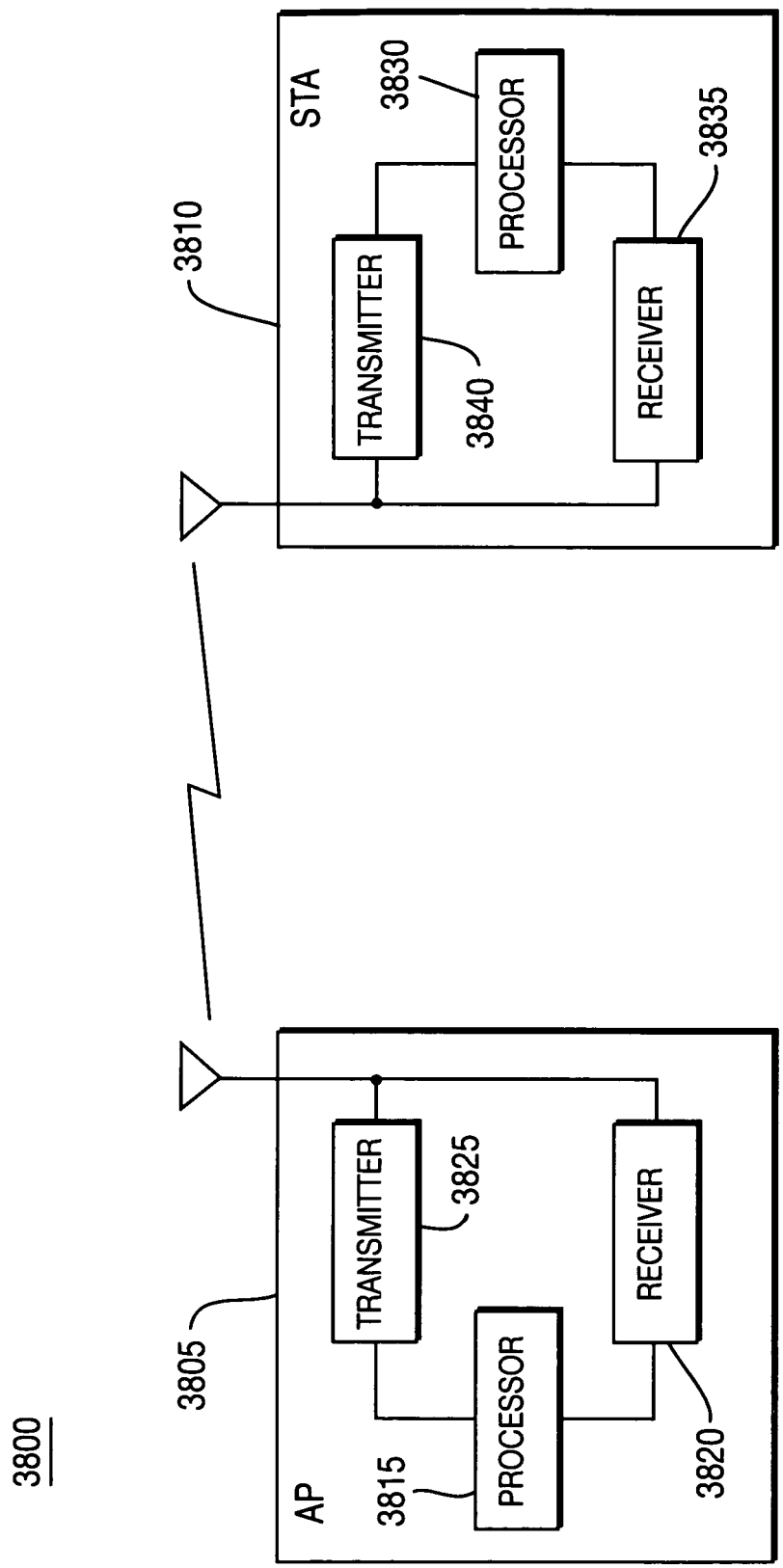
FIG. 38 shows a wireless communication system including an AP and a STA in accordance with the present invention.

FIG. 38 shows a wireless communication system 3800 for controlling access to a wireless communication medium. The system 3800 includes an AP 3805 and at least one STA 3810.

The AP 3805 includes a processor 3815, a receiver 3820 and a transmitter 3825. The processor 3815 is capable of defining a superframe for transmission of data in time domain, the superframe including an HT period which includes at least one SRA and at least one MSRA. The SRA is defined for transmitting traffic data between the AP 3805 and the STA 3810, and the MSRA is defined for transmitting management and control data between the AP 3805 and the STA 3810. The transmitter 3825 is coupled to the processor 3815 for broadcasting an EB. The EB includes information about the SRA and MSRA. The receiver 3820 is also coupled to the processor 3815 for receiving a resource allocation request (RAR) from a STA. The transmitter 3825 sends a response to the RAR for allocating at least one of a particular SRA and an MSRA for the STA 3810.

The STA 3810 includes a processor 3830, a receiver 3835 and a transmitter 3840. The receiver 3835 is coupled to the processor 3830 and receives the EB. The transmitter 3840 is also coupled to the processor 3830 and sends an RAR to the AP 3805 in an MSRA when the STA 3820 needs to access the medium for transmitting traffic data, whereby the STA 3810 and the AP 3805 transmit data at the allocated SRA.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for use in an Institute of Electrical and Electronics Engineers (IEEE) 802.11n access point (AP), the method comprising:
broadcasting, by the IEEE 802.11n AP, an IEEE 802.11 legacy beacon in a beacon interval, wherein the IEEE 802.11 legacy beacon is decodable by legacy IEEE 802.11 stations (STA)s and IEEE 802.11n STAs and includes an indication of whether a second beacon will be broadcasted by the IEEE 802.11n AP within the beacon interval; and
broadcasting, by the IEEE 802.11n AP, the second beacon in the beacon interval, wherein the second beacon is an IEEE 802.11n beacon that is broadcast at a higher data rate than the IEEE 802.11 legacy beacon.

2. The method of claim 1, wherein the indication of whether a second beacon will be broadcasted by the IEEE 802.11n AP within the beacon interval indicates when the IEEE 802.11n beacon will be broadcasted by the IEEE 802.11n AP within the beacon interval.

3. The method of claim 1, wherein the IEEE 802.11n beacon includes information included in the IEEE 802.11 legacy beacon.

4. The method of claim 1, wherein the IEEE 802.11n beacon is identical to the IEEE 802.11 legacy beacon.

5. The method of claim 1, wherein the IEEE 802.11n beacon includes an identification of the IEEE 802.11n beacon.

6. The method of claim 1, wherein the beacon interval is a time period between successive broadcasts of the IEEE 802.11 legacy beacon by the AP.

7. The method of claim 1, wherein the IEEE 802.11n beacon comprises an information element (IE) that indicates a plurality of supported rates.

8. The method of claim 1, wherein the IEEE 802.11n beacon comprises an information element (IE) that indicates an orthogonal frequency division multiplex (OFDM) multiple input multiple output (MIMO) parameter set.

9. The method of claim 1, wherein the IEEE 802.11n beacon comprises an information element that indicates channel information.

10. The method of claim 1, wherein the indication of whether a second beacon will be broadcasted by the IEEE 802.11n AP within the beacon interval includes one of a periodicity, frequency band, or subchannel information of the second beacon.

11. An Institute of Electrical and Electronics Engineers (IEEE) 802.11n access point (AP) comprising:
a transmitter configured to:
broadcast an IEEE 802.11 legacy beacon in a beacon interval, wherein the IEEE 802.11 legacy beacon is decodable by legacy IEEE 802.11 stations (STA)s and IEEE 802.11n STAs and includes an indication of whether a second beacon will be broadcasted by the IEEE 802.11n AP within the beacon interval; and
broadcast the second beacon in the beacon interval, wherein the second beacon is an IEEE 802.11n beacon that is broadcast at a higher data rate than the IEEE 802.11 legacy beacon.

12. The IEEE 802.11n AP of claim 11, wherein the indication indicates when the IEEE 802.11n beacon will be broadcasted by the IEEE 802.11n AP within the beacon interval.

13. The IEEE 802.11n AP of claim 11, wherein the transmitter is configured to broadcast an IEEE 802.11n beacon that includes information included in the IEEE 802.11 legacy beacon.

14. The IEEE 802.11n AP of claim 11, wherein the transmitter is configured to broadcast an IEEE 802.11n beacon that is identical to the IEEE 802.11 legacy beacon.

15. The IEEE 802.11n AP of claim 11, wherein the transmitter is configured to broadcast an IEEE 802.11n beacon that includes an identification of the IEEE 802.11n beacon.

16. The IEEE 802.11n AP of claim 11, wherein the beacon interval is a time period between successive broadcasts of the IEEE 802.11 legacy beacon.

17. The IEEE 802.11n AP of claim 11, wherein the transmitter is configured to broadcast an IEEE 802.11n beacon that comprises an information element (IE) that indicates a plurality of supported rates.

18. The IEEE 802.11n AP of claim 11, wherein the transmitter is configured to broadcast an IEEE 802.11n beacon that comprises an information element (IE) that indicates an orthogonal frequency division multiplex (OFDM) multiple input multiple output (MIMO) parameter set.

19. The IEEE 802.11n AP of claim 11, wherein the transmitter is configured to broadcast an IEEE 802.11n beacon that comprises an information element (IE) that indicates channel information.

20. The IEEE 802.11n AP of claim 11, wherein the indication of whether a second beacon will be broadcasted by the IEEE 802.11n AP within the beacon interval includes one of a periodicity, frequency band, or subchannel information of the second beacon.

21. A method for use in an Institute of Electrical and Electronics Engineers (IEEE) 802.11n high throughput (HT) station (STA), the method comprising:
receiving, from an IEEE 802.11n access point (AP), an IEEE 802.11 legacy beacon in a beacon interval, wherein the IEEE 802.11 legacy beacon is decodable by legacy IEEE 802.11 STAs and IEEE 802.11n STAs and includes an indication of whether a second beacon will be received from the IEEE 802.11n AP within the beacon interval; and
receiving, from the IEEE 802.11n AP, an IEEE 802.11n beacon in the beacon interval, wherein the IEEE 802.11n beacon is received at a higher data rate than the IEEE 802.11 legacy beacon.

22. The method of claim 21, wherein the indication of whether the second beacon will be received from the IEEE 802.11n AP within the beacon interval indicates when the IEEE 802.11n beacon will be received within the beacon interval.

23. The method of claim 21, wherein the IEEE 802.11n beacon includes information included in the IEEE 802.11 legacy beacon.

24. The method of claim 21, wherein the IEEE 802.11n beacon is identical to the IEEE 802.11 legacy beacon.

25. The method of claim 21, wherein the IEEE 802.11n beacon includes an identification of the IEEE 802.11n beacon.

26. The method of claim 21, wherein the beacon interval is a time period between successive broadcasts of the IEEE 802.11 legacy beacon from the IEEE 802.11n AP.

27. The method of claim 21, wherein the IEEE 802.11n beacon comprises an information element (IE) that indicates a plurality of supported rates.

28. The method of claim 21, wherein the IEEE 802.11n beacon comprises an information element (IE) that indicates an orthogonal frequency division multiplex (OFDM) multiple input multiple output (MIMO) parameter set.

29. The method of claim 21, wherein the IEEE 802.11n beacon comprises an information element (IE) that indicates channel information.

30. The method of claim 21, wherein the indication of whether a second beacon will be broadcasted by the IEEE 802.11n AP within the beacon interval includes one of a periodicity, frequency band, or subchannel information of the second beacon.

31. An Institute of Electrical and Electronics Engineers (IEEE) 802.11n high throughput (HT) station (STA) comprising:
　a receiver configured to:
　　receive, from an IEEE 802.11n access point (AP), an IEEE 802.11 legacy beacon in a beacon interval, wherein the IEEE 802.11 legacy beacon is decodable by legacy IEEE 802.11 STAs and IEEE 802.11n STAs and includes an indication of whether a second beacon will be received from the IEEE 802.11n AP within the beacon interval; and
　　receive, from the IEEE 802.11n AP, the second beacon in the beacon interval, wherein the second beacon is an IEEE 802.11n beacon that is received at a higher data rate than the IEEE 802.11 legacy beacon.

32. The IEEE 802.11n HT STA of claim 31, wherein the receiver is further configured to receive an indication that includes when the IEEE 802.11n beacon will be received from the IEEE 802.11n AP within the beacon interval.

33. The IEEE 802.11n HT STA of claim 31, wherein the receiver is configured to receive an IEEE 802.11n beacon that includes information included in the IEEE 802.11 legacy beacon.

34. The IEEE 802.11n HT STA of claim 31, wherein the receiver is configured to receive an IEEE 802.11n beacon that is identical to the IEEE 802.11 legacy beacon.

35. The IEEE 802.11n HT STA of claim 31, wherein the receiver is configured to receive an IEEE 802.11n beacon that includes an identification of the IEEE 802.11n beacon.

36. The IEEE 802.11n HT STA of claim 31, wherein the beacon interval is a time period between successive broadcasts of the IEEE 802.11 legacy beacon from the IEEE 802.11n AP.

37. The IEEE 802.11n HT STA of claim 31, wherein the receiver is configured to receive an IEEE 802.11n beacon that comprises an information element (IE) that indicates a plurality of supported rates.

38. The IEEE 802.11n HT STA of claim 31, wherein the receiver is configured to receive an IEEE 802.11n beacon that comprises an information element (IE) that indicates an orthogonal frequency division multiplex (OFDM) multiple input multiple output (MIMO) parameter set.

39. The IEEE 802.11n HT STA of claim 31, wherein the receiver is configured to receive an IEEE 802.11n beacon that comprises an information element (IE) that indicates channel information.

40. The IEEE 802.11 HT STA of claim 31, wherein the indication of whether a second beacon will be broadcasted by the IEEE 802.11n AP within the beacon interval includes one of a periodicity, frequency band, or subchannel information of the second beacon.

41. An Institute of Electrical and Electronics Engineers (IEEE) 802.11n access point (AP) comprising:
　a transmitter configured to:
　　broadcast an IEEE 802.11 legacy beacon in a beacon interval, wherein the IEEE 802.11 legacy beacon is decodable by legacy IEEE 802.11 stations (STA)s and IEEE 802.11n STAs and includes an indication of whether a second beacon will be broadcasted by the IEEE 802.11n AP within the beacon interval; and
　　broadcast the second beacon in the beacon interval, wherein the second beacon is an IEEE 802.11n beacon that is decodable only by IEEE 802.11n STAs.

42. The IEEE 802.11n AP of claim 41, wherein the IEEE 802.11n beacon has a greater transmission range compared to the IEEE 802.11 legacy beacon.

43. The IEEE 802.11n AP of claim 41, wherein the IEEE 802.11n beacon includes an indication that the IEEE 802.11n beacon is an IEEE 802.11n beacon.

\* \* \* \* \*